(12) United States Patent
Langford et al.

(10) Patent No.: US 10,625,424 B2
(45) Date of Patent: Apr. 21, 2020

(54) SELF-ASSEMBLING ASSEMBLERS AND MANIPULATORS BUILT FROM A SET OF PRIMITIVE BLOCKS

(71) Applicant: Massachusetts Institute of Technology, Cambridge, MA (US)

(72) Inventors: William Kai Langford, Cambridge, MA (US); Amanda Ghassaei, Cambridge, MA (US); Neil Gershenfeld, Cambridge, MA (US)

(73) Assignee: Massachusetts Institute of Technolog, Cambridge, MA (US)

( * ) Notice: Subject to any disclaimer, the term of this patent is extended or adjusted under 35 U.S.C. 154(b) by 0 days.

(21) Appl. No.: 15/338,960

(22) Filed: Oct. 31, 2016

(65) Prior Publication Data

US 2017/0043485 A1   Feb. 16, 2017

Related U.S. Application Data

(62) Division of application No. 15/034,974, filed as application No. PCT/US2016/031058 on May 5, 2016, now Pat. No. 10,155,314.

(60) Provisional application No. 62/158,343, filed on May 7, 2015.

(51) Int. Cl.
| | |
|---|---|
| *B25J 9/16* | (2006.01) |
| *B25J 9/00* | (2006.01) |
| *B25J 9/08* | (2006.01) |
| *G05B 19/042* | (2006.01) |

(52) U.S. Cl.
CPC .......... *B25J 9/1687* (2013.01); *B25J 9/0084* (2013.01); *B25J 9/08* (2013.01); *G05B 19/042* (2013.01); *G05B 2219/40261* (2013.01)

(58) Field of Classification Search
CPC .......... B25J 9/1687; B25J 9/0084; B25J 9/08; G05B 2219/40261; G05B 19/042
See application file for complete search history.

(56) References Cited

U.S. PATENT DOCUMENTS

| | | | | |
|---|---|---|---|---|
| 5,136,201 A | * | 8/1992 | Culp | .......... B25J 5/00 310/328 |
| 5,659,477 A | * | 8/1997 | Collins | .......... B25J 9/1617 700/117 |
| 6,510,359 B1 | * | 1/2003 | Merkle | .......... G05B 19/41805 700/121 |
| 2005/0246056 A1 | * | 11/2005 | Marks | .......... B65G 57/245 700/213 |

(Continued)

*Primary Examiner* — Duy T Nguyen
(74) *Attorney, Agent, or Firm* — Robert P. Greenspoon; Flachsbart & Greenspoon LLC

(57) ABSTRACT

A machine that is capable of assembling a copy of itself from a feedstock of parts is described. The machine operates on a lattice or grid on which it is able to move and from which it receives power and control signals. The machine (assembler) is composed of modules that each perform some functionality. In the simplest case, only three module types are needed: a linear step module, a gripper, and an anchor. The linear step module is capable of moving from one lattice location to the next, the gripper module is capable of gripping other modules, and the anchor module is capable of attaching the machine to the grid. With these three primitives it is possible for this simple machine to move on the grid using inchworm-like motions, pick up other modules, and assemble a copy of itself.

9 Claims, 26 Drawing Sheets

(56) References Cited

U.S. PATENT DOCUMENTS

| | | | |
|---|---|---|---|
| 2008/0074004 A1* | 3/2008 | Yamamoto | C04B 35/493 |
| | | | 310/358 |
| 2010/0165516 A1* | 7/2010 | Fuchino | G11B 5/486 |
| | | | 360/294.4 |
| 2014/0300211 A1* | 10/2014 | Peek | H02K 41/03 |
| | | | 310/12.17 |
| 2015/0297387 A1* | 10/2015 | Thompson | A61F 5/02 |
| | | | 602/19 |

* cited by examiner

1102 PARTS

Mechanical
- structural   flexible
- expanding
  (e.g. thermal, piezoelectric)

Electrical
- conductive   insulating
- resistive

Semiconducting
- N-type   P-type
- N+ type   P+ type

Magnetic
- soft   hard
- ferromagnetic

1104 FUNCTIONS

Mechanical – Passive
- revolute   prismatic
- spring

Mechanical – Active
- bending   shearing
- longitudinal   transverse

Electrical – Passive
- conducting   insulating
- resistive   capacitive
- inductive

Electrical – Active
- transistor   diode

1106 MODULES

Motion Constraint
- large disp. linear
- large disp. revolute

Motion Generation
- walking   inching
- gripping

Electronic
- digital
- logic
- flip flop
- latch
- oscillator
- analog
- boost
- op-amp

1108 SYSTEMS

Mechatronic
- linear axis
- rotary axis
- micro-gripper
- assembler

Computing
- sequencing
- sampling
- processing
- memory

FIG. 11

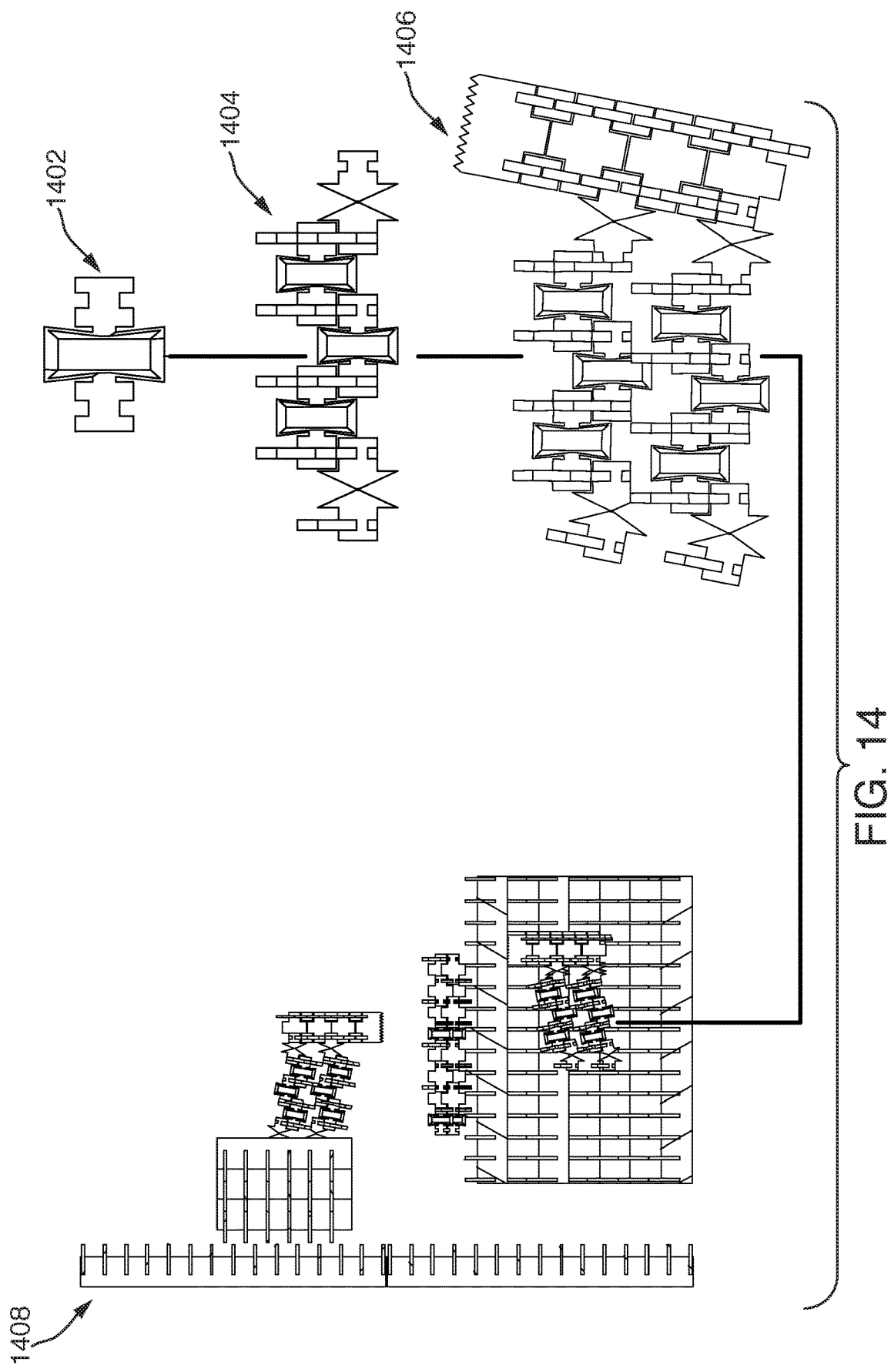

SELF-ASSEMBLING ASSEMBLERS AND MANIPULATORS BUILT FROM A SET OF PRIMITIVE BLOCKS

This application is a division of U.S. National Stage Application Ser. No. 15/034,974, filed May 6, 2016. This application claims the benefit of U.S. Provisional Application No. 62/158,343, filed May 7, 2015, the entire disclosure of which is herein incorporated by reference.

This invention was made with government support under Grant/Contract No. NSF CMMI-1344222 awarded by NSF. The government has certain rights in the invention.

TECHNICAL FIELD OF THE INVENTION

The present invention relates to robotic assembly, and more specifically to self-assembling assemblers.

BACKGROUND OF THE INVENTION

Skidmore et al. have proposed a concept for an array of self-assembling micro-manipulators. They show exponential assembly through the sequential fan-out of manipulators assembling other manipulators and show that in N steps the system can assemble $2^N$ manipulators. [G. D. Skidmore, E. Parker, M. Ellis, N. Sarkar, and R. Merkle, "Exponential assembly," Nanotechnology, vol. 12, no. 3, pp. 316-321, September 2001.] This concept, however, requires prefabricated sheets of component parts and is not capable of making arbitrary structures. Pelrine et al. have demonstrated a system in which many robots controlled in parallel can work together to build structures. The system is comprised of a substrate with carefully routed electrical traces and permanent magnet "robots" which levitate above the substrate and are controlled by a central processor. [R. Pelrine, A. Wong-foy, B. Mccoy, D. Holeman, R. Mahoney, G. Myers, J. Herson, and T. Low, "SRI Robot Swarm," 2012.] A NASA Institute for Advanced Concepts report details some concepts and guidelines for the design and development of self-replicating systems. [T. Toth-Fejel, "Modeling Kinematic Cellular Automata Final Report," pp. 1-74, 2004]. Of these, the Moses Universal Constructor [M. Moses, "A Physical Prototype of a Self-replicating Universal Constructor, University of New Mexico, 2001] has come closest to physically realizing a self-assembling system but was limited because the feedstock was overly complex and did not allow for the construction of strong, scalable systems.

This invention describes a robotic assembler, a "robosome," that can assemble almost anything, including itself.

The complexity and diversity of life is based on an inventory of just twenty parts, the common amino acids, which are combined by the ribosome to create the range of molecular machinery. Their discrete construction allows errors to be detected and corrected, global geometry to be determined by local constraints, and the scalability of ribosomes making ribosomes. This invention brings these attributes into regimes of engineered materials that are not available in molecular biology.

This invention is accomplished by developing a basis set of building blocks that are inorganic analogs to amino acids. Instead of basic vs. acidic, hydrophobic vs. hydrophilic, . . . , these are conducting vs. insulating, ferromagnetic vs. ferroelectric, . . . . They are linked by mechanically reversible joints analogous to bonds, with a workflow to design with them and plan their placement. The assembler is initially conventionally constructed, and then in stages its components will be replaced with the parts that it's assembling. The assembler is essential to this roadmap, and is itself a paradigmatic test case for the integration of a functional system.

The outcome of the invention is digitized fabrication, analogous to the earlier digitization of communication and computation, by embodying codes in the construction of materials. Beyond the current focus in advanced manufacturing on additive versus subtractive processes, this invention introduces a much more fundamental transition to assembly and disassembly. Potential disruptive benefits include a radical simplification of material supply chains down to a small number of feedstocks, and the ability to exponentially ring up manufacturing capacity on demand.

Benefits of building functional systems with assemblers that assemble assemblers include:

Saving time: the time for a product to go from component vendors, to OEMs, to inventory, to delivery can be replaced by production in the field.
  Simplifying supply: large inventories and long supply chains to remote locations can be replaced by assemblers fed by a standard set of parts.
  Rapid customization: because assembly is done on demand, what is produced can be dynamically modified to match a mission.
  Increasing integration: technology today is poorly integrated across length scales; by spanning them with a common process, size and weight can be reduced, and related capabilities combined.
  Eliminating waste: unneeded products can be disassembled to their constituent components and reused, rather than disposed.
  Adding capacity: because assemblers can be tasked to build other assemblers, manufacturing capacity can be increased exponentially rather than linearly to meet demand.
  Adapting designs: by retaining assemblers as part of the systems that they assemble, they can become reconfigurable to adapt to dynamically changing requirements. Alternative approaches include:
  3D printing: This is currently receiving a great deal of attention, but is limited in the range of properties compatible with a multimaterial printing process. Expensive inks are needed for good conductors, and semiconductors show poor carrier mobility. The approach taken here can instead assemble elements made from bulk electronic materials.
  IC fabrication: Chip fabrication requires millions of dollars for mask sets, billions of dollars for fabs, and turn times of many months. The approach taken here does not aim to compete with the incremental cost per chip following that investment of time and money; it targets significantly reducing both the time and cost for quick-turn, lowrate production. Existing chip fab is also limited to on the order of ten metal layers; the assembly approach aims to significantly increase complexity with a fundamentally three-dimensional process.
  Electronics manufacturing: The pick-and-place machines used to assemble circuit boards are two-dimensional and analog parts can be placed in arbitrary locations on boards. The task of the three-dimensional assembler to be developed is simplified by the discretization of the material, quantizing the motion system to relative displacements on a lattice. Also, part feeding is simplified from large numbers of varying reels to small numbers of standard shapes.

Reconfigurable robotics: This promises universal rather than special purpose robots, but the smallest pitches have been on the order of a centimeter, and the number of modules in the range of tens to hundreds, limited by the demanding system integration required. The assembler to be developed is a new kind of reconfigurable robot, building modules out of, rather than into, the primitive elements.

Materials genome: These initiatives have been something of a misnomer, because they are more like recipes, cataloging how a wide range of materials can be continuously combined to vary their properties. The approach to be taken here is much more like a genome, with a small set of basis components.

Self-assembly: the complexity that can be attained with self-assembly is limited by diffusional time scales, error accumulation, and an exponential difficulty in coordination. Biological assembly, like this invention, is better understood as coded rather than self-assembly, with messenger RNAs bringing instructions, transfer RNAs bringing parts, joints being made in the ribosome, and chaperones guiding folding.

This invention mandates revisiting decades of assumptions and historical practices about the nature of design representations, material specifications, manufacturing process planning, and machine and motion control. The "robosome" assemblers are a new kind of relative robot, that functions as a part of the structure that it's assembling. This process will be reversible, replacing disposal with disassembly and reuse.

The most profound question posed by this invention is what the minimum requirements are to bootstrap a technological civilization. Models for in-situ resource utilization typically recapitulate the stages of the industrial revolution; this invention can instead be thought of as the technological equivalent of the evolution of the building blocks for life. The results will be particularly relevant for operations in remote, resource constrained, and rapidly changing environments that cannot assume existing support infrastructure.

SUMMARY OF THE INVENTION

The primary goal of this invention is to develop an assembler that can assemble itself out of the parts that it is assembling. This will be realized by developing engineering analogs to amino acids. The twenty standard amino acids are discretely combined to create the molecular machinery in living systems, ranging from the motors in muscles, to the photoreceptors in eyes, to the synapses in brains. Likewise, a set of universal building blocks for engineered systems has been developed through this invention.

Just two part types, conducting and insulating, will replace the layers, traces, and vias in printed circuit boards, along with the connectors on them and wiring between them. At a finer pitch, those same two parts are assembled into inductors and capacitors, which are then combined into RF matching networks and antennas. A third resistive part type will be added to assemble resistors with variable values, form factors, and current capacities, replacing the roughly 500,000 resistor types in the electronic inventory today. Semiconducting part types are added to assemble discrete and then integrated logic, flexural part types to assemble mechanisms, and magnetic and piezoelectric part types for actuation.

This discrete set of parts are linked by reversible joints. These are spatial analogs to digital codes, allowing global geometries to be determined by local constraints, placement errors to be detected and corrected, and disassembly and reuse of the parts.

Three-dimensional interconnect and integrated circuits, and optical metamaterials are example uses of the invention. The invention can be used for manufacturing at the end of long supply chains, such as for reconfiguring spacecraft hardware.

The automated assemblers described herein are essential for realizing this roadmap. They are constructed from conventional machine components, and then in stages are replaced by the parts being assembled. There is utility in shrinking feature sizes, with a larger assembler producing a smaller one. But the primary focus on assembling the assembler is for the essential role that that plays in scaling. Rather than seeking linear increases in assembly speed or parallel part placement, the ultimate result will be an exponential increase in the number of assemblers, like the exponential increase in the number of cells in a bioreactor.

This invention encompasses an assembler that assembles assemblers. The invention can be understood as a "robosome," a robotic ribosome. Like the essential role of the ribosome in making all other proteins, the invention is a universal machine to make machines, including itself.

The invention is based on "digital" materials which are reversibly assembled from a discrete set of parts, with a discrete set of relative positions and orientations [Digital Materials for Digital Printing, G. A. Popescu, N. Gershenfeld, and T. Mahale, D F 2006 International Conference on Digital Fabrication Technologies, Denver, Colo. (2006)] These attributes allow metrology to be local, so that an assembler can make something larger than itself; errors to be detected and corrected, so that an assembler can make something more accurately than its own positioning; heterogeneous materials to be joined in a common process, and objects to be disassembled and reused rather than disposed. The assembled structures can behave as bulk materials with effective properties beyond those of existing materials [Reversibly Assembled Cellular Composite Materials, Kenneth C. Cheung and Neil Gershenfeld, Science (341), pp. 12191221 (2013)].

Assembler primitives can be assembled from just four part types. Piezoelectric blocks are used in pairs to create a walking motion in the linear motion axis. A microgripper, which can manipulate the blocks it is made of, is formed as a flexural linkage which amplifies the expansion of the piezo actuators. A clamping device can be made which can secure the assembler to the lattice. With these three primitive functions, an assembler can be made that can move on a lattice, pick up, and place its own parts.

The heart of this invention is the development of engineering analogs to amino acids. A wide range of molecular machines, such as the motor proteins in muscles and the light-sensing molecules in the eye, are made from twenty common amino acids. Each contributes a fundamental property, like hydrophobicity versus hydrophilicity, that can be combined to create complex functions. They are built by the ribosome according to assembly sequences carried by messenger RNAs. Rather than being based on biochemistry, the building blocks in this invention span the attributes of engineered materials, with again on the order of twenty parts types, including rigid and flexible, conducting and insulating, majority and minority carriers, and saturated and permeable magnetization. These are mechanically linked by reversible joints that serve as bonds.

BRIEF DESCRIPTION OF THE DRAWINGS

FIG. 11 is a taxonomy of brick-types at each level of hierarchy.

FIG. 14 illustrates a natural hierarchy enforced as blocks are assembled into higher-level parts via a piezoelectric block.

DETAILED DESCRIPTION OF INVENTION

Figure 1:
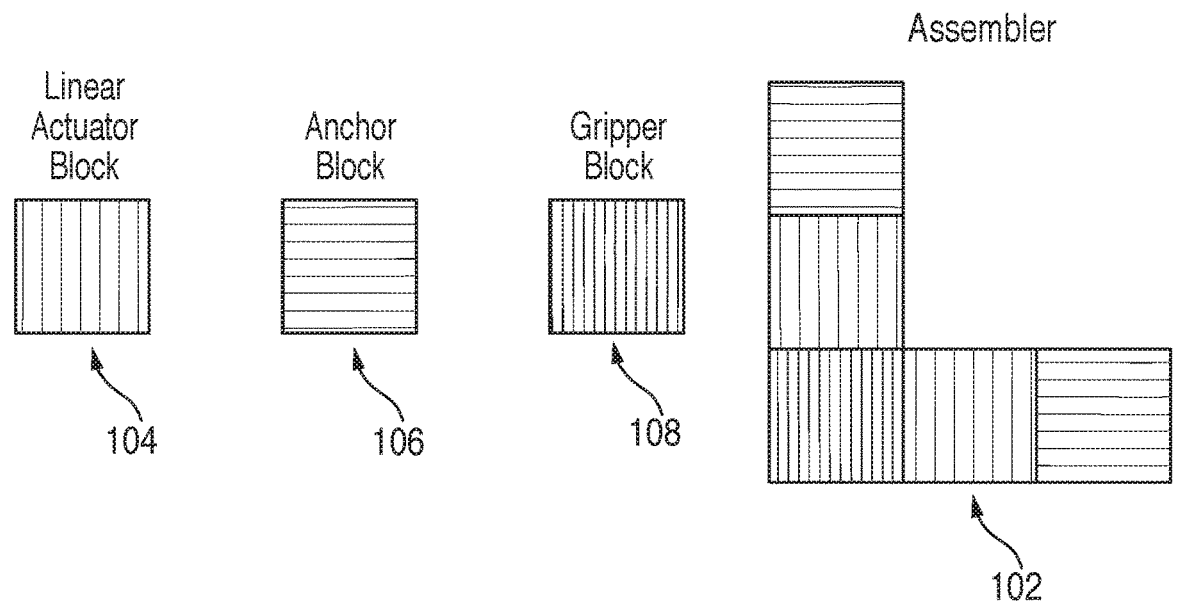
FIG. 1 is an assembler composed of modular parts.
Figure 2:
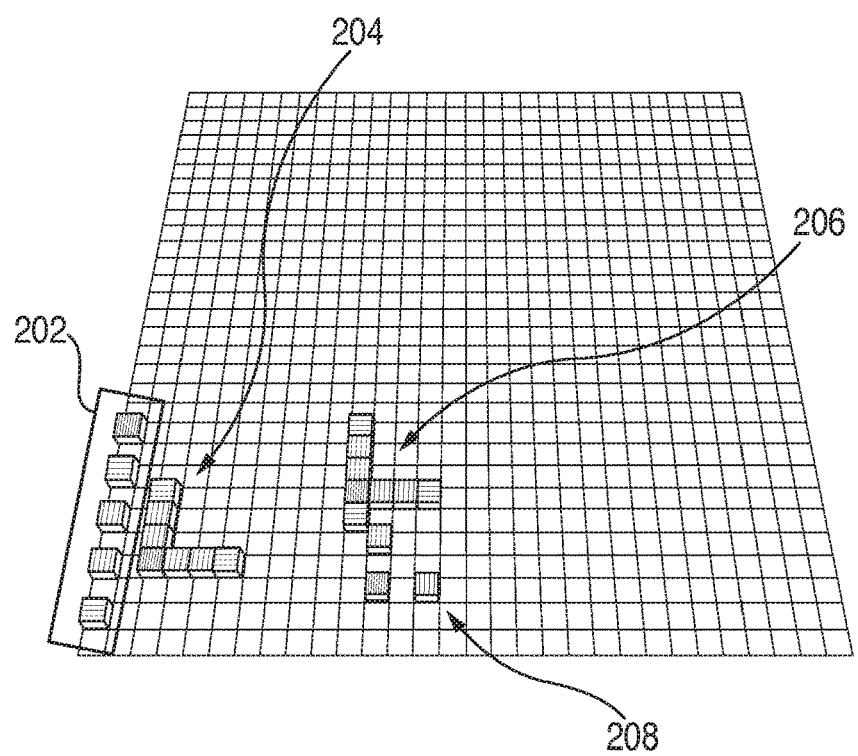
FIG. 2 shows a self-assembling assembler simulation.

The invention describes a machine that is capable of assembling a copy of itself from a feedstock of parts. The machine operates on a lattice or grid on which it is able to move and from which it receives power and control signals. FIG. 1 shows the assembler 102 composed of modular parts. The machine (assembler) 102 is composed of modules that each perform some functionality. In the simplest case, only three module types are needed: a linear step module 104, a gripper 108, and an anchor 106 (FIG. 1). The linear step module 104, or linear actuator block 104, expands by one unit cell along its length and is capable of moving from one lattice location to the next. The gripper module 108, or gripper block 108 reversibly attaches to other blocks so they may be "picked" and "placed" and is capable of gripping other modules. The anchor module 106, or anchor block 106, attaches to the grid on which the assembler crawls, and is capable of attaching the machine to the grid. With these three primitives it is possible for this simple machine 102 to move on the grid using inchworm-like motions, pick up other modules, and assemble a copy of itself (FIG. 2). FIG. 2 depicts a self-assembling assembler simulation, and shows a feedstock of modules 202, an assembler going to pick up a block 204, an assembler placing a block 206, and an assembler being built 208.

Figure 3:
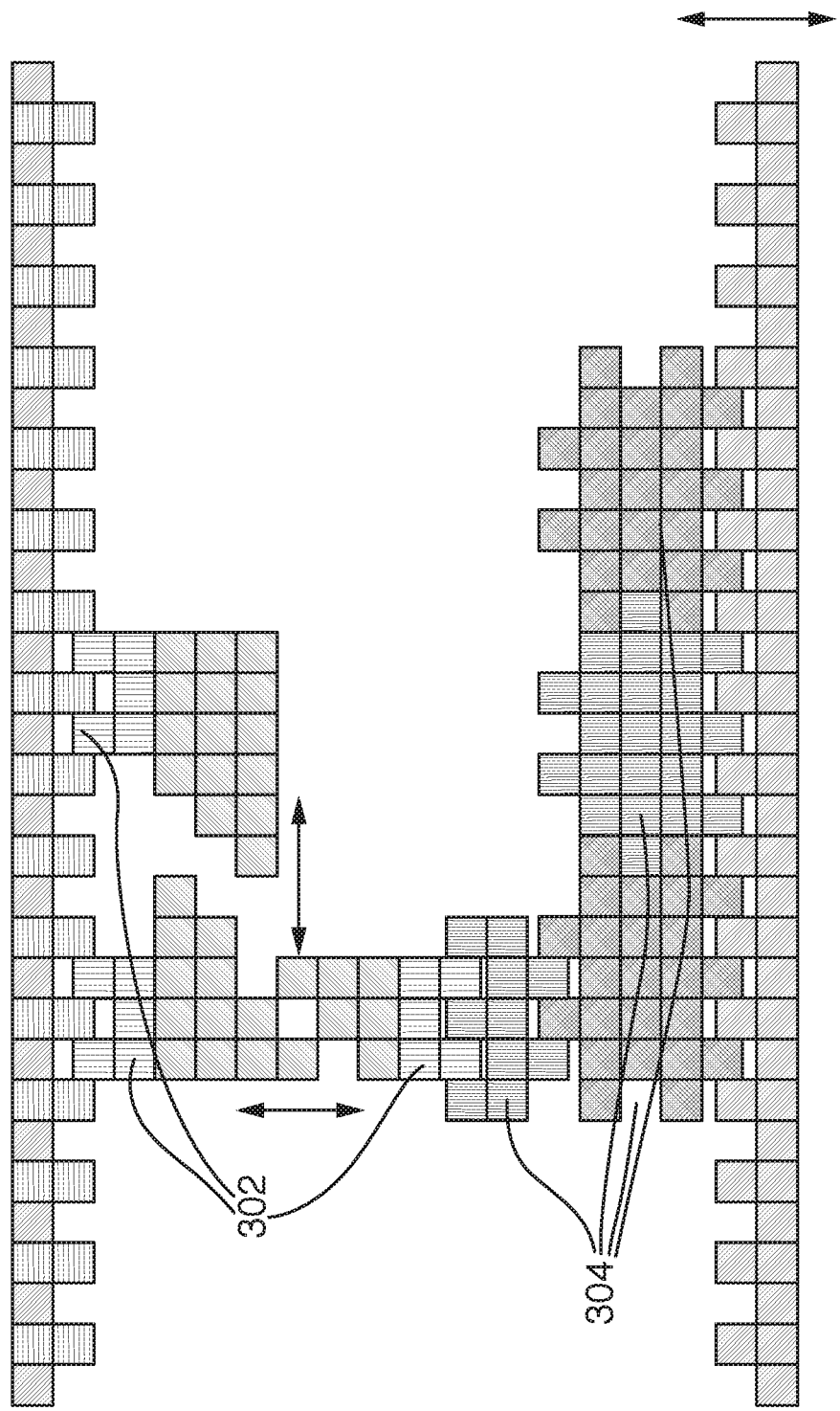
FIG. 3 shows the assembler crawling on the grid above and placing parts below layer by layer.

These primitives enable locomotion and assembly on a two-dimensional grid. To enable three-dimensional assembly an alternative configuration may be used in which the assemblers still locomote on a two dimensional grid but place parts layer by layer to build three-dimensional structures. In this embodiment, the assembler crawls on the underside of the grid and place parts below it (FIG. 3). In FIG. 3, the assembler 302 crawls on the grid above and places parts 304 below layer by layer.

Initially the modules are built using conventional fabrication means (either subtractively or additively). Actuation may be accomplished, for example, using electromagnetics, electrostatics, piezoelectrics, or thermally.

Figure 4A:
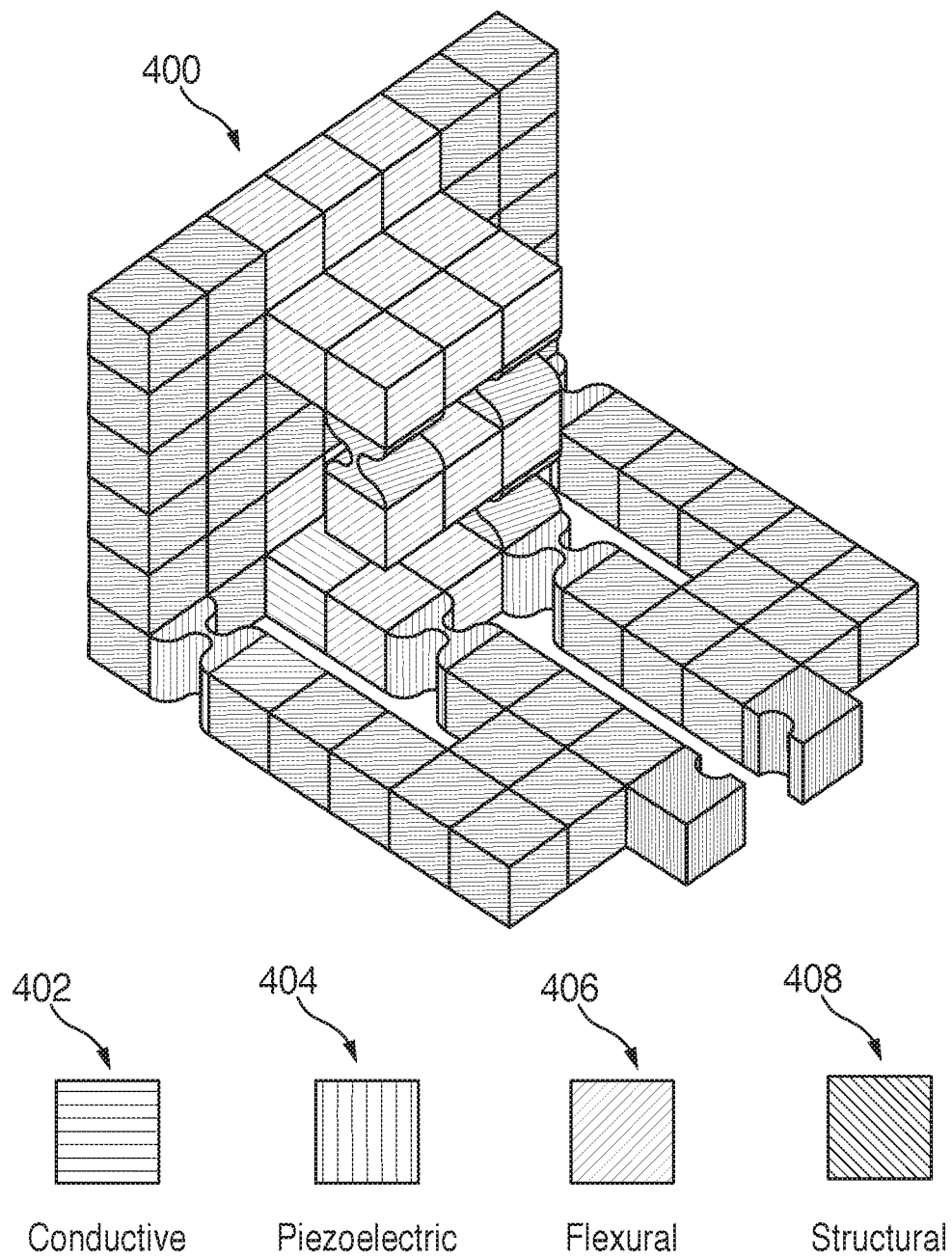
FIG. 4A is a microgripper assembled from simple part-types.
Figure 4B:
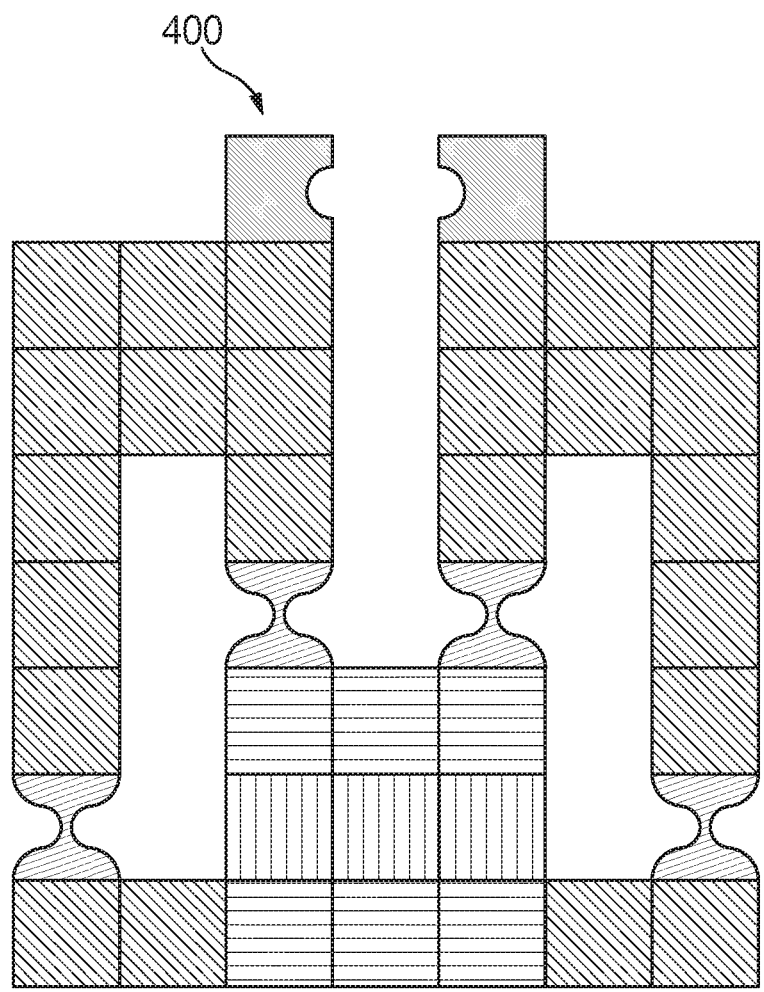
FIG. 4B is a cross-sectional view of the microgripper of FIG. 4A.
Figure 5:
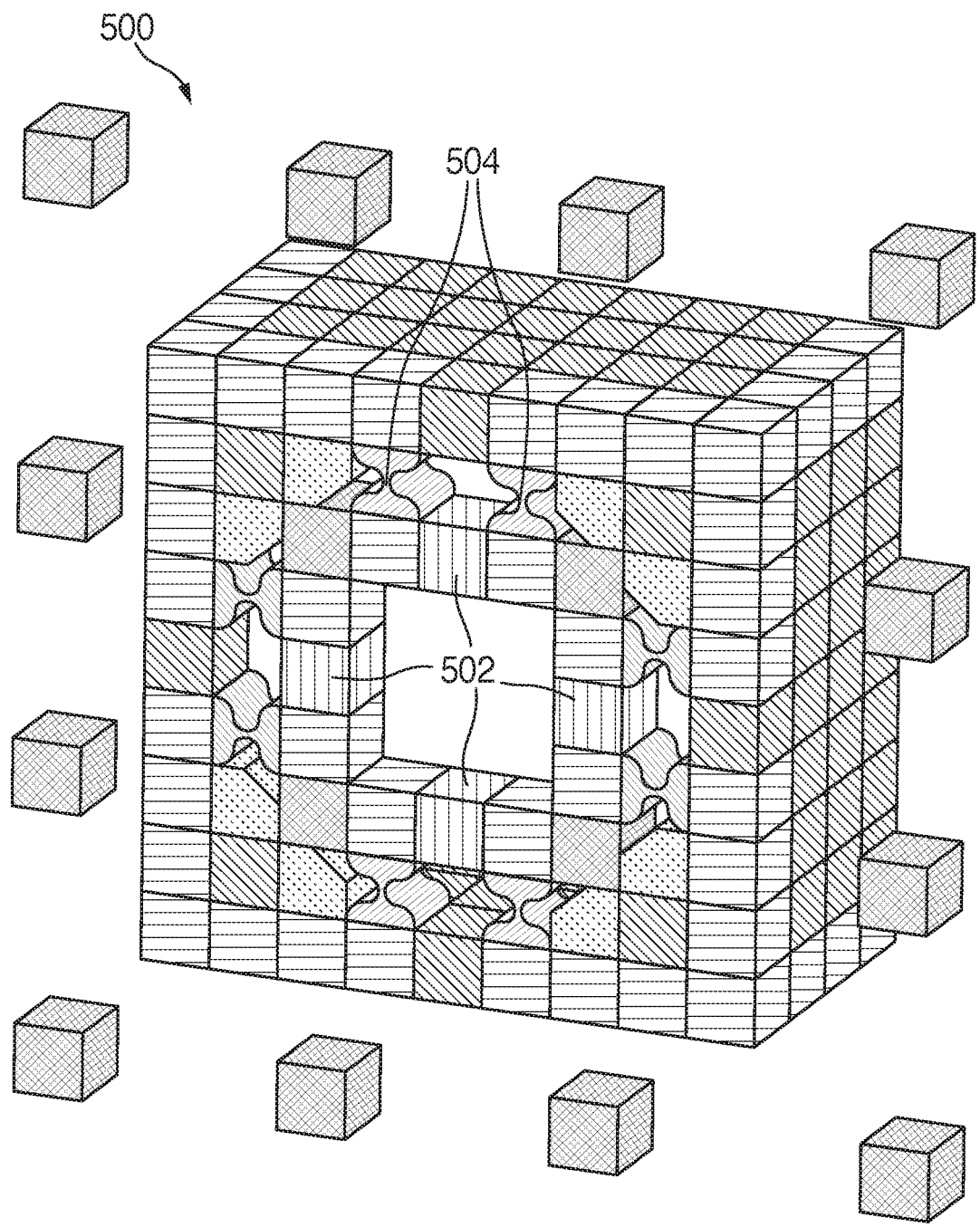
FIG. 5 is an anchor module gripping attachment points on the grid.
Figure 6A:
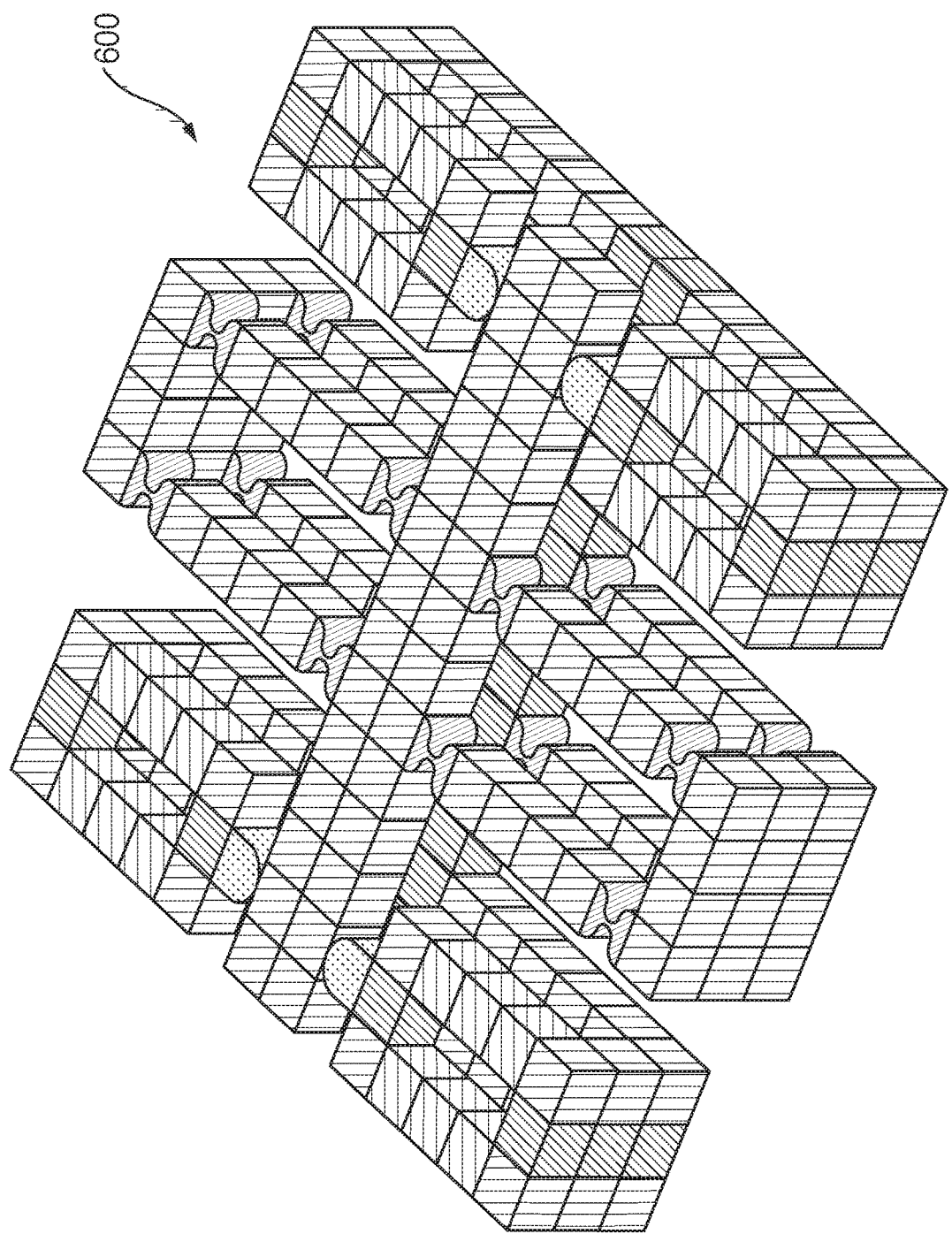
FIG. 6A is detail of a linear translator actuator block (piezo bimorph driven linear inchworm motor).
Figure 6B:
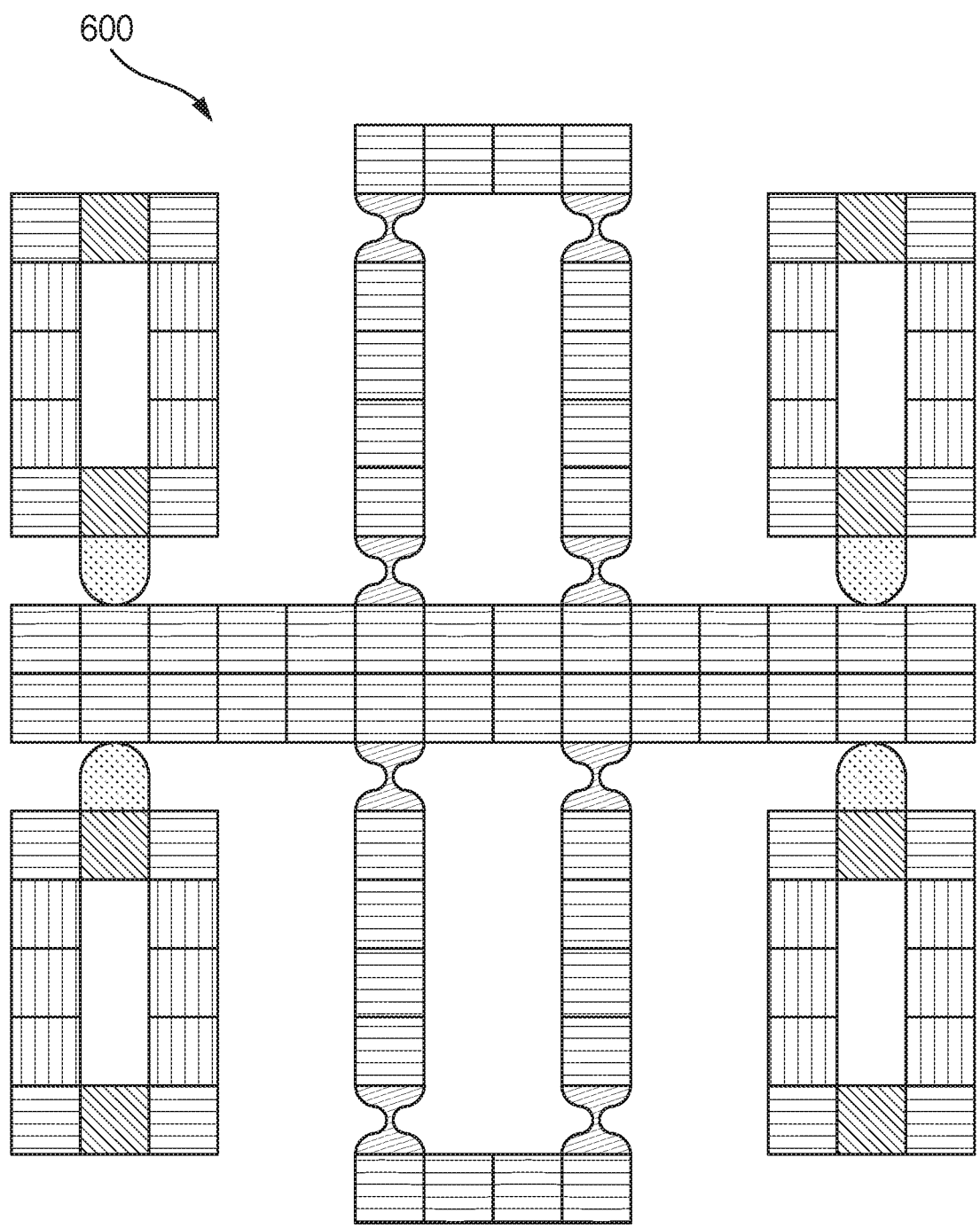
FIG. 6B is a cross-sectional view of the linear translator actuator block shown in FIG. 6A.

To scale the system both up in complexity and down in length-scale, the modules themselves are made from a feedstock of smaller, simpler parts (referred to as blocks). The feedstock of parts, for example, may consist of a structural block, a conductive block, a piezoelectric block, and a flexural block. FIG. 4A illustrates how a micro-gripper 400 module may be assembled from a feedstock of simple block-types. The microgripper 400 is made of conductive 402, piezoelectric 404, flexural 406, and structural 408 parts. In this example, a compliant mechanism is made through the strategic placement of flexural and rigid elements such that the expansion of the piezoelectric blocks at the base of the mechanism are converted into a gripping motion at the tips. FIG. 4B is a cross-sectional view of the microgripper of FIG. 4A. An anchor module 500 and a linear step module 600 are depicted in FIG. 5 and FIG. 6A, respectively. The anchor module 500 is gripping attachment points 504 on the grid, and grips the lattice using a compressive force at multiple points 504 generated from the expansion of the piezoelectric blocks 502. FIG. 6A shows the detail of a linear actuator block 600 (piezo bimorph driven linear inchworm motor). The linear step module 600 is a compliant linear mechanism which moves relative to its base via the periodic expansion and contraction of alternating sides of piezo bimorph actuators. FIG. 6B is a cross-sectional view of the linear translator actuator block shown in FIG. 6A.

Figure 7:
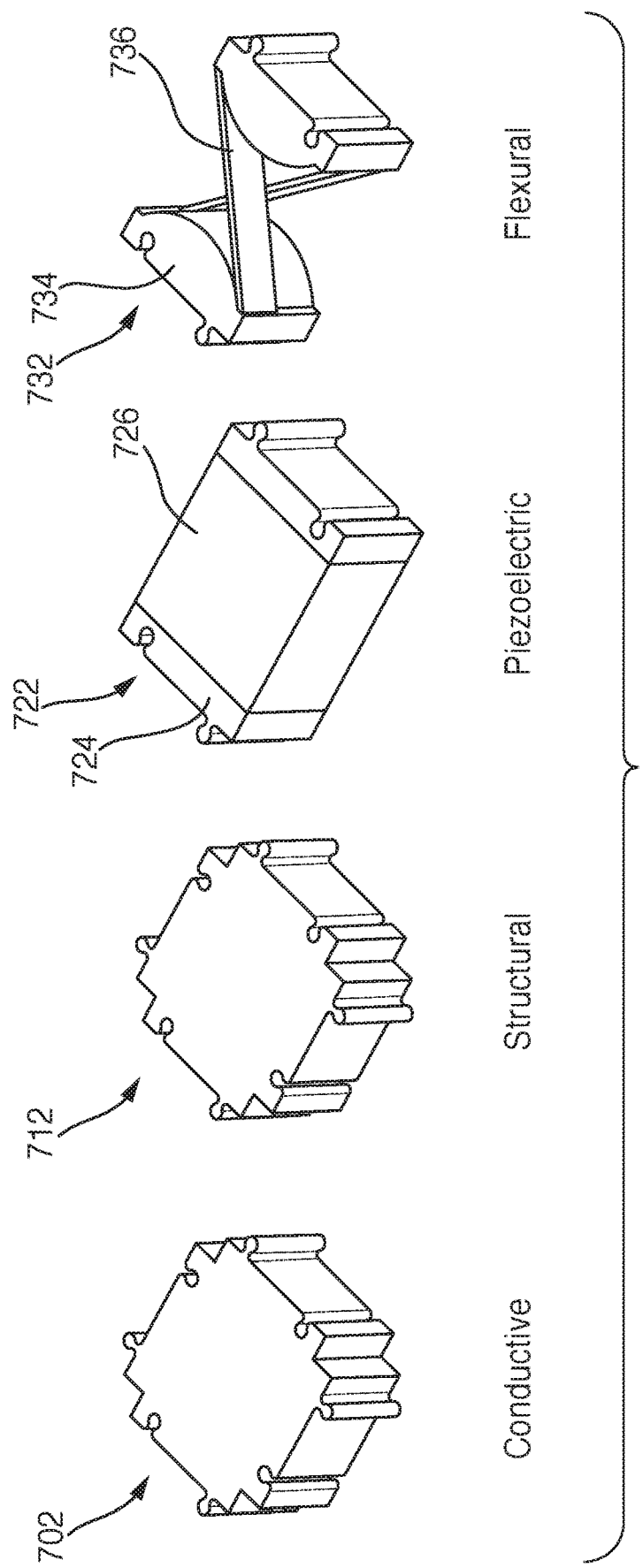
FIG. 7 shows the details of some of the block types.

The blocks themselves may be either a single material or a composite of multiple materials. FIG. 7 illustrates some of the block-types in further detail. Block types can be conductive 702, structural 712, piezoelectric 722, or flexural 732. Joints between the blocks are made with interlocking geometric features. The conductive 702 and structural 712 blocks provide four in-plane connections and are composed of a single bulk material (e.g., fiberglass for structure and copper for conductivity). The piezoelectric 722 and flexural 732 block provide only two in-plane connections and are composed of multiple materials in order to achieve the desired functionality. In this embodiment, the piezoelectric block 722 is made up of copper 724 and lead zirconate titanate (PZT) 726, and the flexural block 732 is made up of fiberglass 734 and nitinol 736.

Figure 8A:
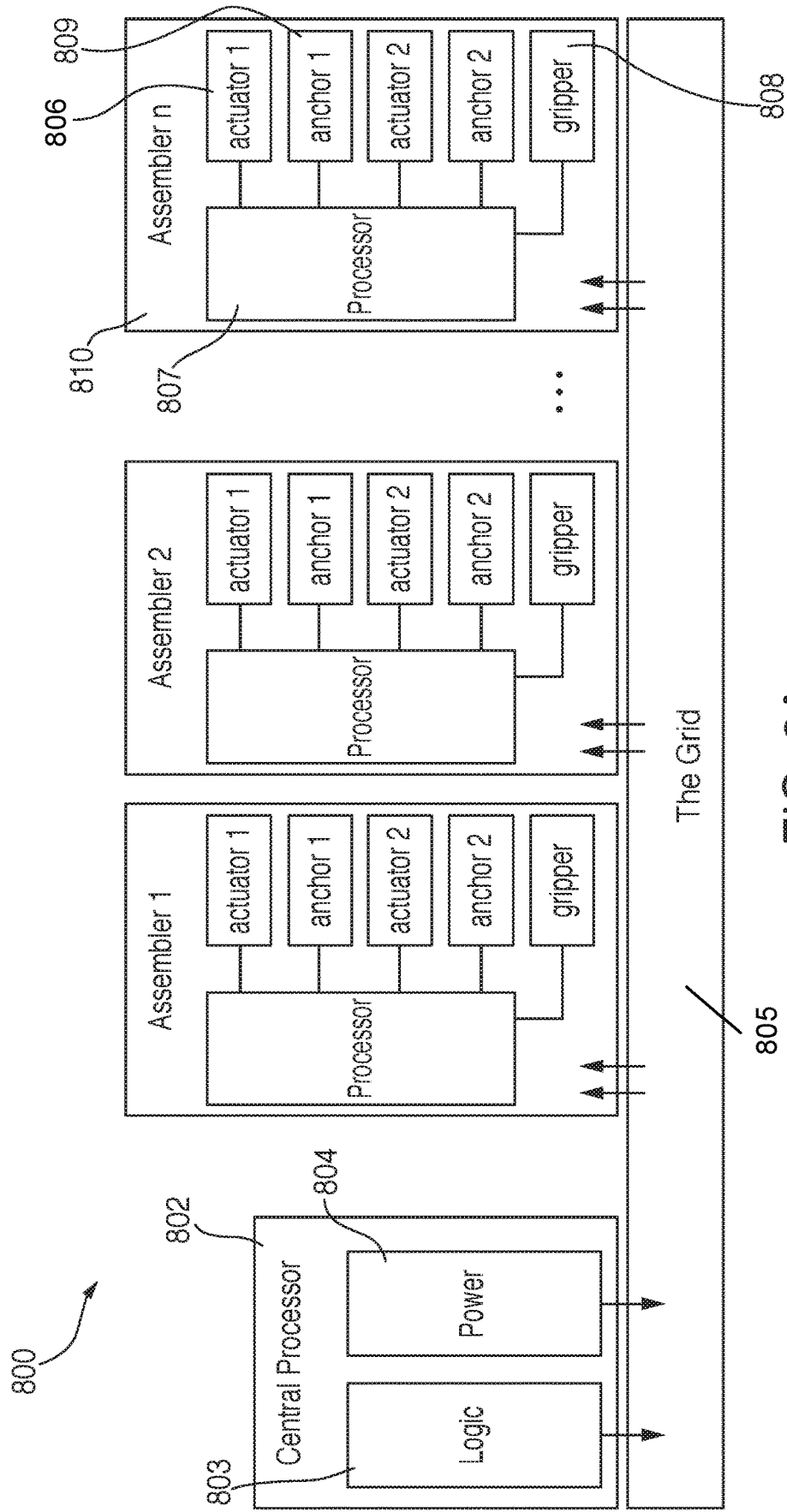
FIG. 8A is a block diagram for a distributed architecture of parallel assembly.

FIG. 8A shows a block diagram for an embodiment of a distributed architecture of parallel assembly 800. In implementing the control of the system, it's desirable to have a central processor 802 containing logic 803 and power 804 responsible for coordinating the many assemblers 810 to enable the parallel assembly of a single structure. In a specific implementation, a centralized "build queue" may represent all of the parts that need to be placed. When an assembler 810 is done with its previous task, it pulls a new job or part from this centralized build queue and executes a specific task (e.g., place a gripper module 808 at x=40, y=50). This central processor 802 may also be responsible for the control of the individual actuators 806 or anchors 809 within an assembler 810 or it may hand-off that control to a sub-processor 807 onboard each assembler (FIG. 8A). Because the system is based on centralized control through the grid 805 and assemblers take discrete steps on a known lattice 805, it can be run without any closed-loop feedback. The position of the assemblers 810 on the grid 805 is known deterministically from the history of movement/control commands sent to them.

Figure 8B:
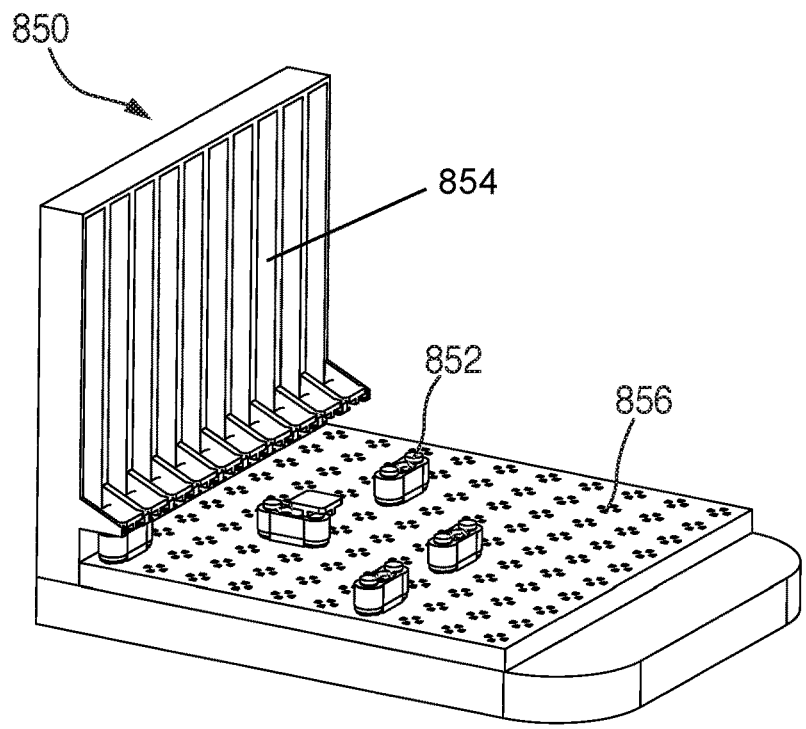
FIG. 8B is a distributed architecture for parallel assembly.
Figure 8C:
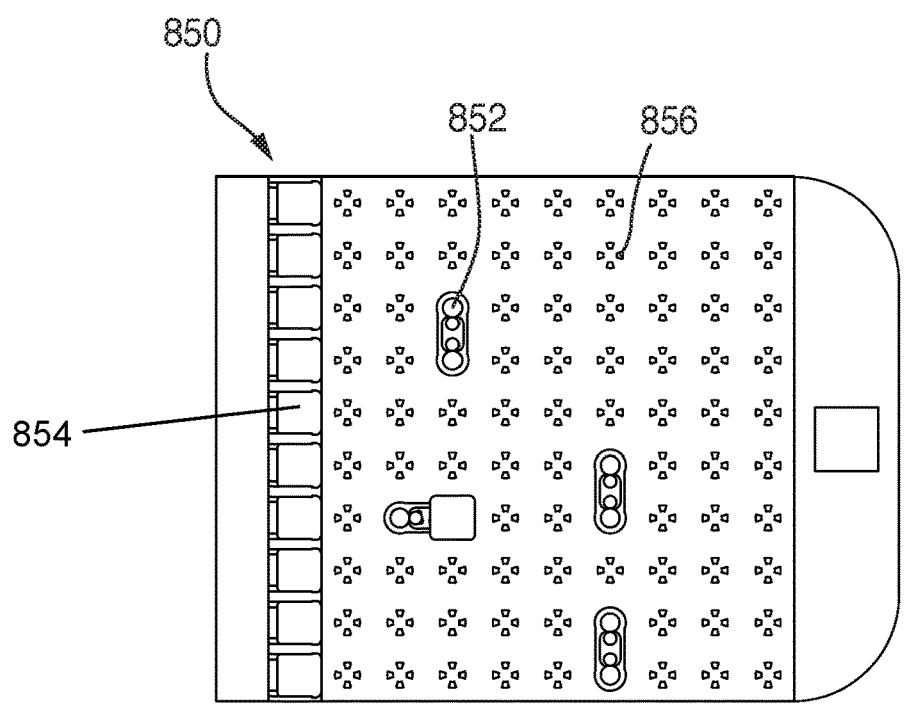
FIG. 8C is a top view of the lattice of the distributed architecture of parallel assembly.

FIG. 8B shows a distributed architecture for another embodiment of parallel assembly 850. Each assembler 852 is a simple machine with only a few degrees of freedom and is capable of carrying a single part and moving from one lattice location 856 to the next. The assemblers 852 receive power and control instructions from the substrate that they locomote on. At the edge of the substrate, magazines store a feedstock 854 of different part-types. A global z-axis raises the build-platform as each layer is populated by the mobile assemblers 852. FIG. 8C is a top view of the lattice of the distributed architecture of parallel assembly 850.

Figure 9:
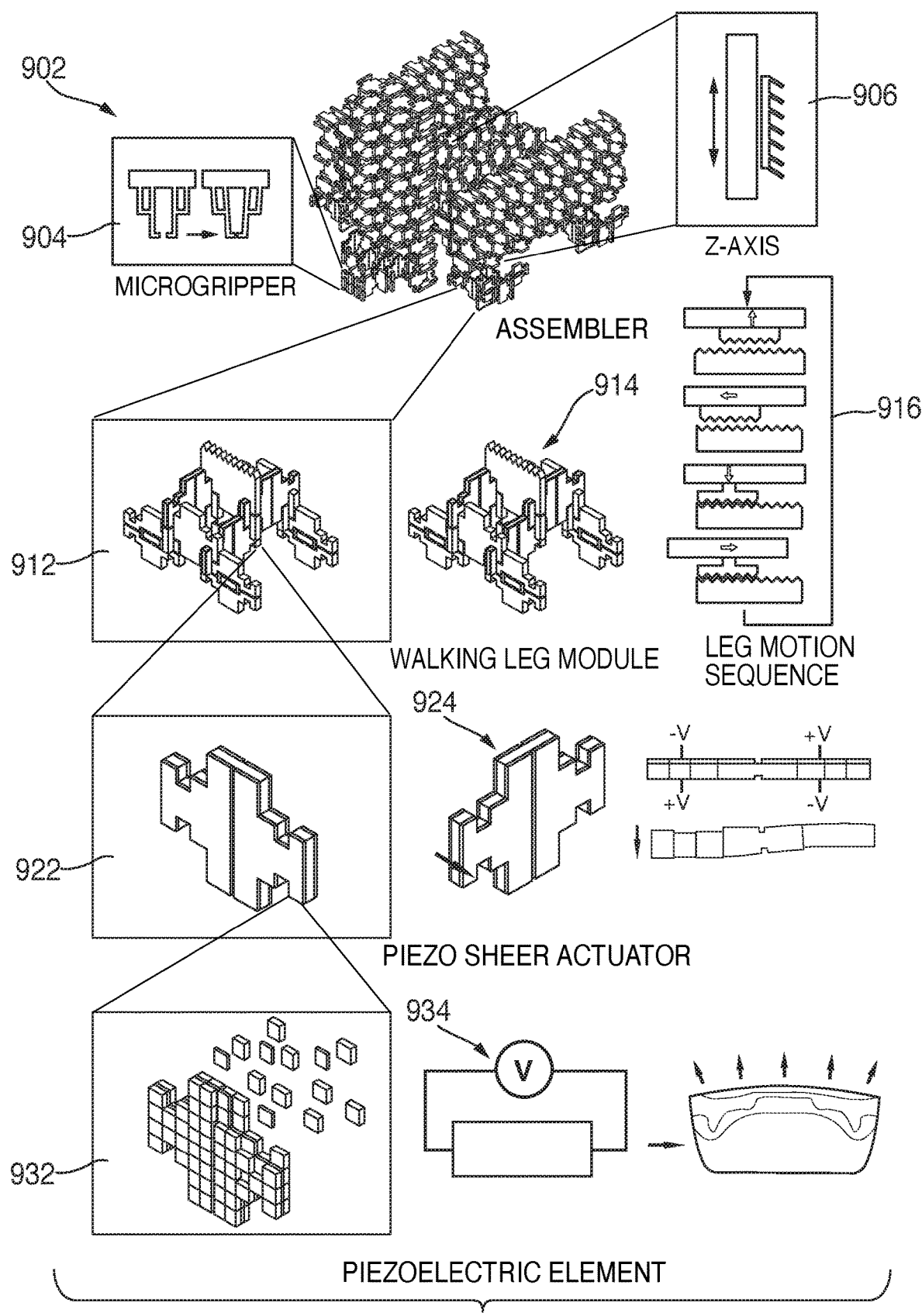
FIG. 9 is the hierarchical decomposition of the assembled systems.

FIG. 9 shows the hierarchical decomposition of the assembled system. The hierarchical decomposition of the assembled systems is analogous of the primary, secondary, tertiary, and quaternary structure of proteins. At the top level of the hierarchy is the system 902, composed of several microgrippers 904. The global z-axis 906 raises the build-platform as each layer is populated by the mobile assemblers. At the second level of the hierarchy are the modules 912, including a walking leg module 914. Depicted at this level is a leg motion sequence 916. At the third level of the hierarchy is the function 922 of the module, which can include a piezo shear actuator 924. At the bottom of the hierarchy is a part 932, which is a piezoelectric element 934.

Figure 10B:
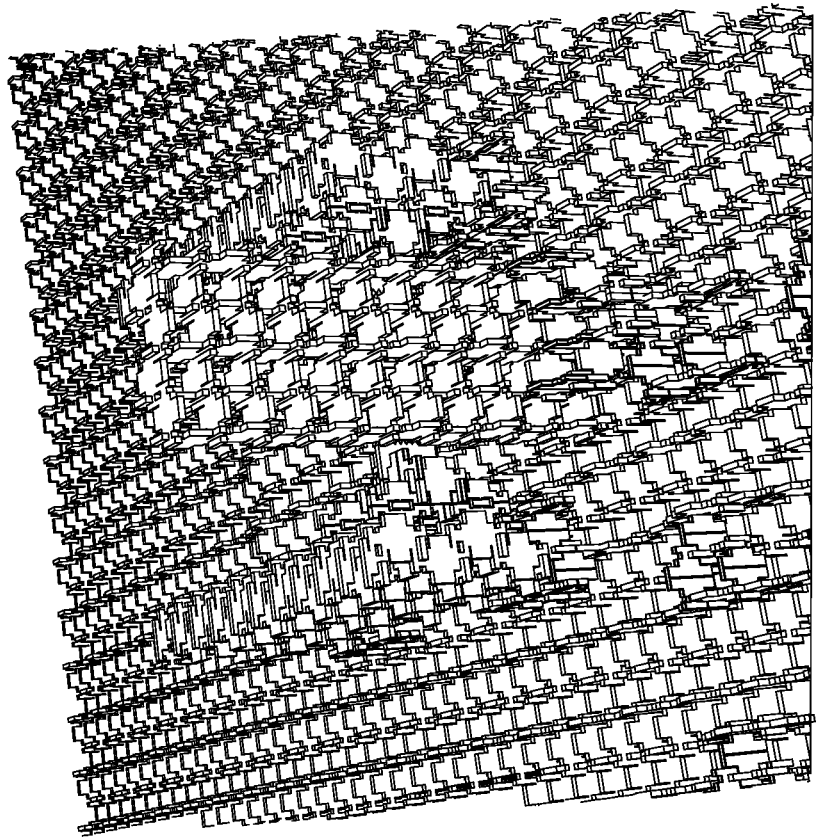
FIG. 10B depicts the assembler of FIG. 10A with its gripper module lowered to place a part.
Figure 10A:
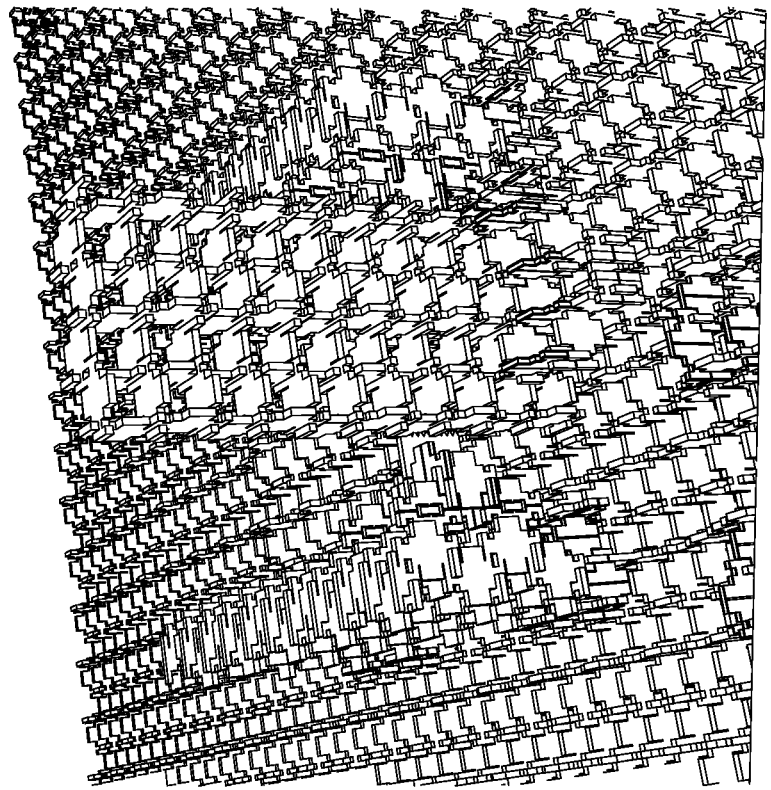
FIG. 10A depicts an assembler before placing a part.

FIG. 10A depicts the assembler before placing a part, while 10B depicts the assembler with its gripper module lowered to place a part.

FIG. 11 is a taxonomy of brick-types at each level of hierarchy. Parts 1102 can be mechanical (including structural, flexible, and/or expanding—e.g., thermal, piezoelectric), electrical (including conductive, insulating, and/or resistive), semiconducting (including N-type, P-type, N+ type, and/or P+ type), or magnetic (including soft, hard, and/or ferromagnetic). Functions 1104 can be mechanical-passive (including revolute, prismatic, and/or spring), mechanical-active (including bending, shearing, longitudinal, and/or transverse), electrical-passive (including conducting, insulating, resistive, capacitive, and/or inductive), or electrical-active (including transistor and/or diode). Modules 1106 can be motion constraint (including large disp. linear and/or large disp. revolute), motion generation (including walking, inching, and/or gripping), electronic (including digital—logic, flip flop, latch, oscillator and/or analog—boost, op-amp). Systems 1108 can be mechatronic (including linear axis, rotary axis, micro-gripper, and/or assembler) or computing (including sequencing, sampling, processing, and/or memory).

Figure 12:
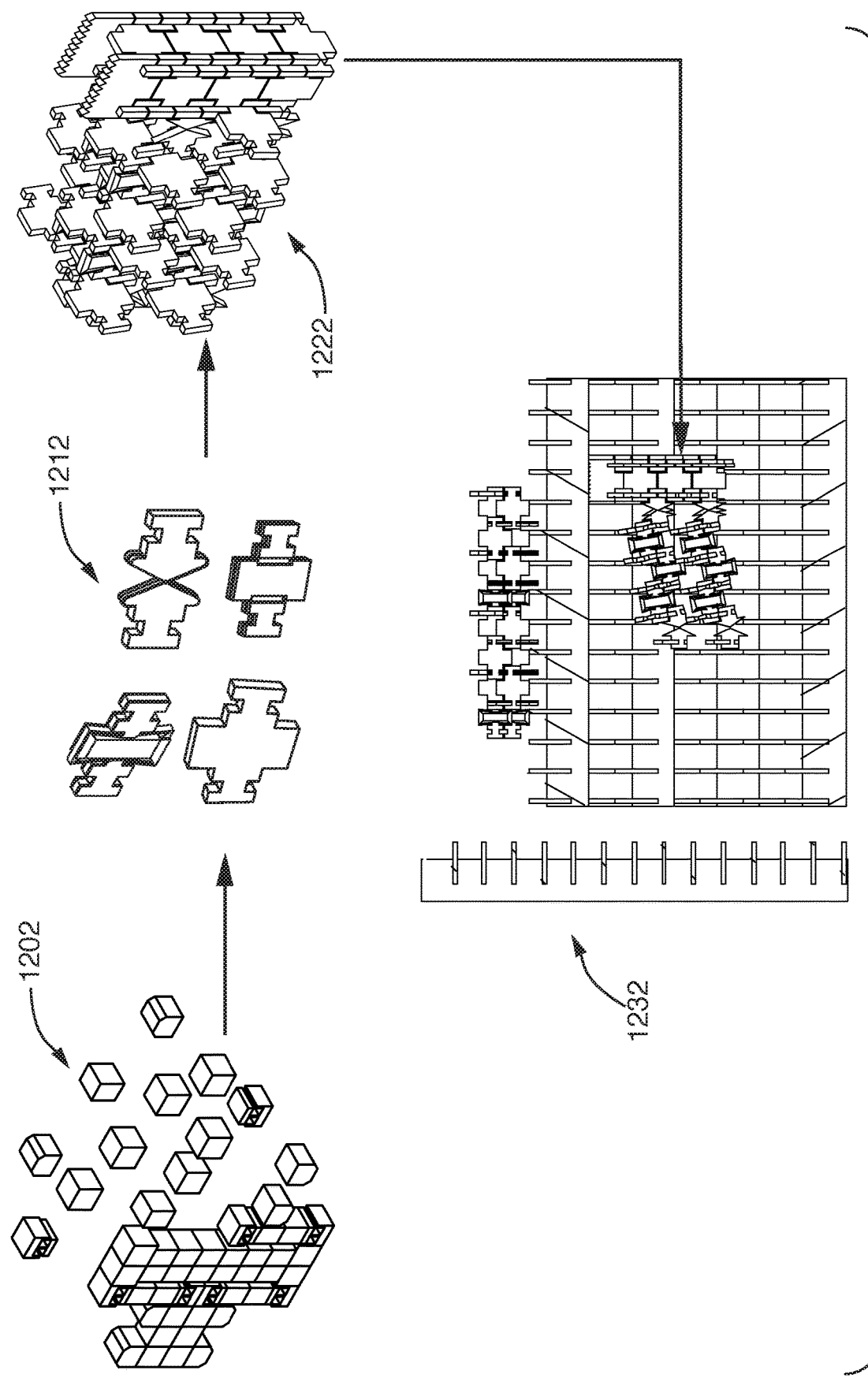
FIG. 12 shows the hierarchy from parts to functions to modules to systems.

FIG. 12 depicts the hierarchy from parts (1202) to functions (1212) to modules (1222) to systems (1232). In this case, item 1202 shows how a linear piezo actuator function is assembled from conductive and flexural parts. Item 1212 is the linear piezo actuator which deforms longitudinally when voltage is applied to it. Item 1222 shows a walking leg module (similar in function to the item labeled "walking leg module" in FIG. 9) which is constructed from many piezo actuators (as well as other functional parts). Finally, item 1232 is showing a section/cutaway of an alternate assembler configuration wherein the leg modules (item 1222) are used to move a linear degree-of-freedom. The assembly of parts in the upper section of item 1232 is a new module being assembled and the assembly of parts below that is the walking leg module (item 1222). Importantly, the arrow between item 1222 and item 1232 is pointing point to the leg module rather than the part being assembled.

Figure 13:
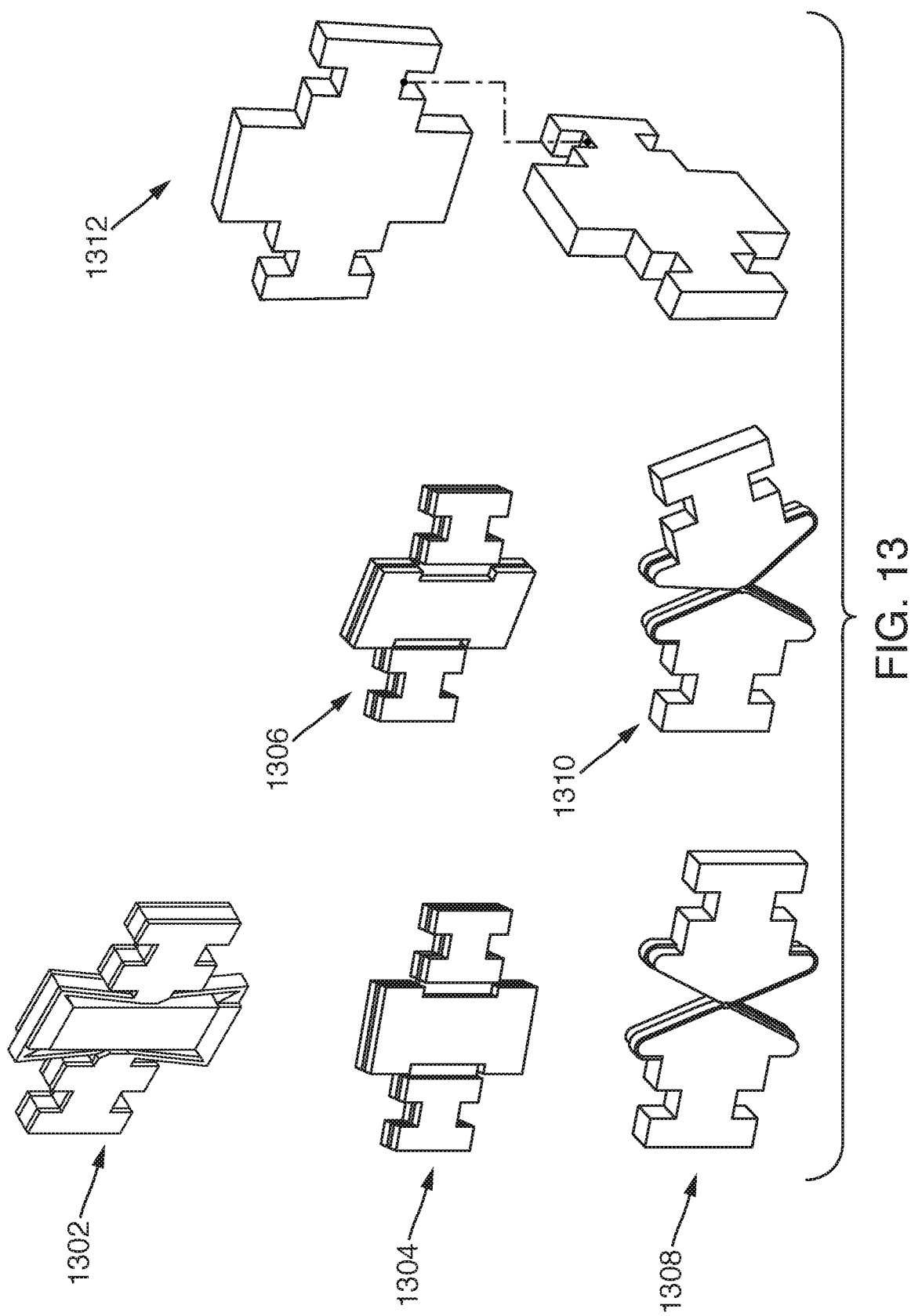
FIG. 13 illustrates functional bricks from which mechanisms and robotic modules can be assembled.

FIG. 13 shows functional bricks. The invention focuses on the development of functional bricks from which mechanisms and robotic modules can be assembled. These bricks include functions such as hinge joints, actuation, conductivity, and structure. Item 1302 is a piezo linear actuator. Item 1304 is a double-hinge joint or "shear joint" which allows a shear and rotational degree-of-freedom. Item 1306 is a displaced/deformed version of item 1304. Item 1308 is a rotary hinge joint. Item 1310 is a displaced/deformed version of item 1308. Item 1312 shows how the functional bricks interlock.

There is a natural hierarchy enforced as blocks are assembled into higher-level parts, which then become blocks to assemble even higher-level functionality. In FIG. 14, a piezoelectric block 1402 is a part of a large-displacement linear actuator mechanism 1404, which is, in turn, part of a walking leg mechanism 1406, which, in turn, is part of an assembler stage 1408.

It's possible to use multi-scale parts with features that connect parts of different sizes. This enables sparsity in the lattice where density is not needed and increases potential build speed. To estimate assembly speed, assume 1 k×1 k×1 k addressable volume elements, comparable to the dynamic range of a typical 3D printer. With a part placement rate of 1 kHz, comparable to the drop frequency in ink-jet printing, it would require 11 days to fill this volume. Two approaches will be used to accelerate this. The first recognizes that, like video coding, what's being transmitted to the assembler is not a random pattern. There's a natural hierarchical decomposition of a design into larger blocks with repeated properties. The analog of a pyramidal coder is multi-scale parts, with mating features across length scales. A 100:1 compression ratio reduces the build time to a few hours, comparable to typical 3D printing.

Figure 15A:
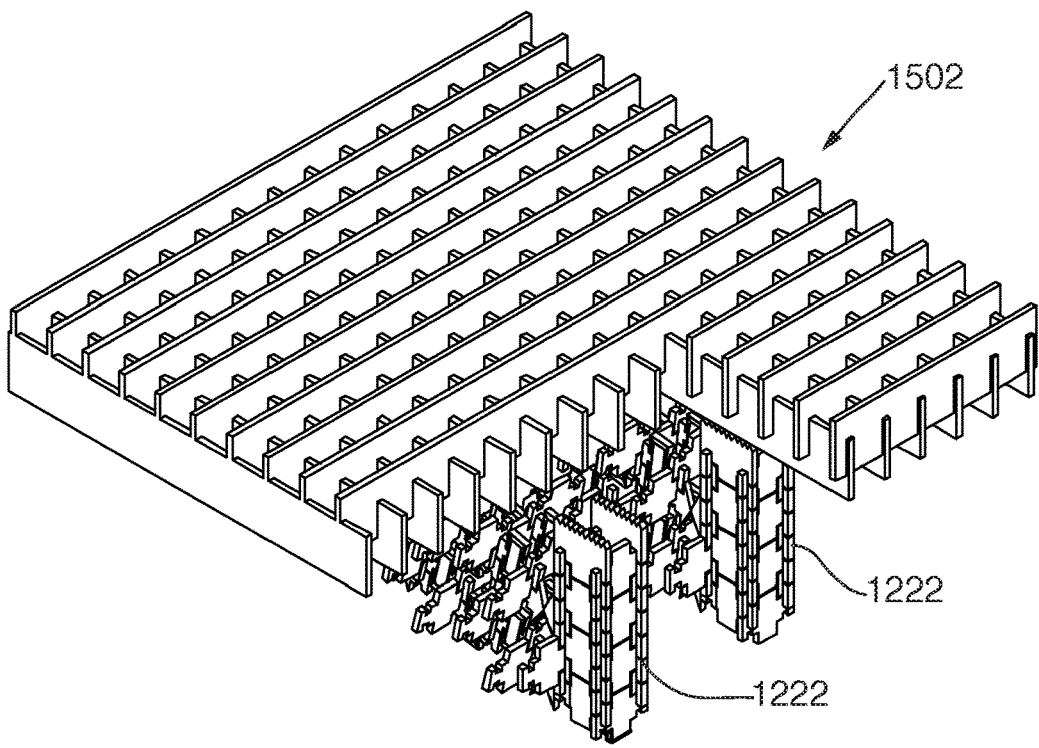
FIG. 15A shows a cutaway of two leg-modules situated below a build-stage.
Figure 15B:
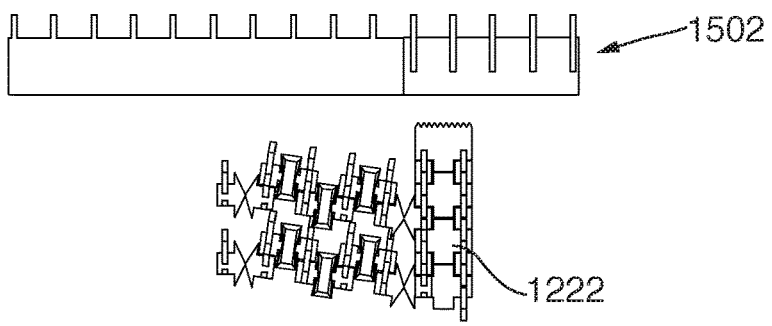
FIG. 15B depicts a leg module in a retracted configuration.
Figure 15C:
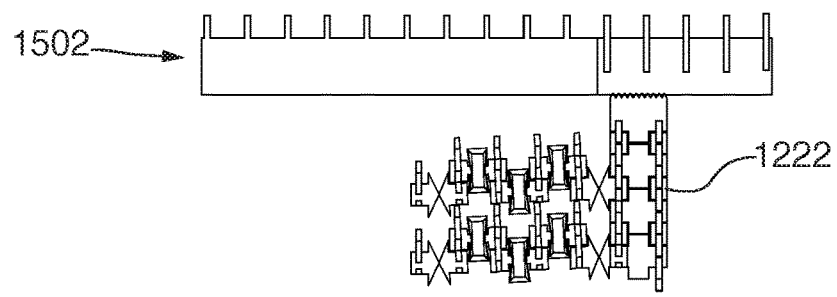
FIG. 15C depicts a leg module engaged with a build-stage.

Through the arrangement of the functional bricks, more complex mechanisms can be assembled. For example, FIG. 15A-C illustrates a walking motor which moves the stage above it through the sequential firing of a series of piezo actuator bricks. FIGS. 15A-C show the same walking leg module 1222 depicted in FIG. 12. FIG. 15A shows a cutaway of two leg-modules 1222 situated below a build-stage (on which new modules/systems are built). FIG. 15B depicts the leg module in its retracted configuration. FIG. 15C depicts the leg module 1222 engaged with the build-stage 1502. The leg modules 1222 work by synchronously walking the build-stage 1502 to the left or right (looking at FIGS. 15B/C) such that one leg is always engaged (FIG. 15C).

Figure 16:
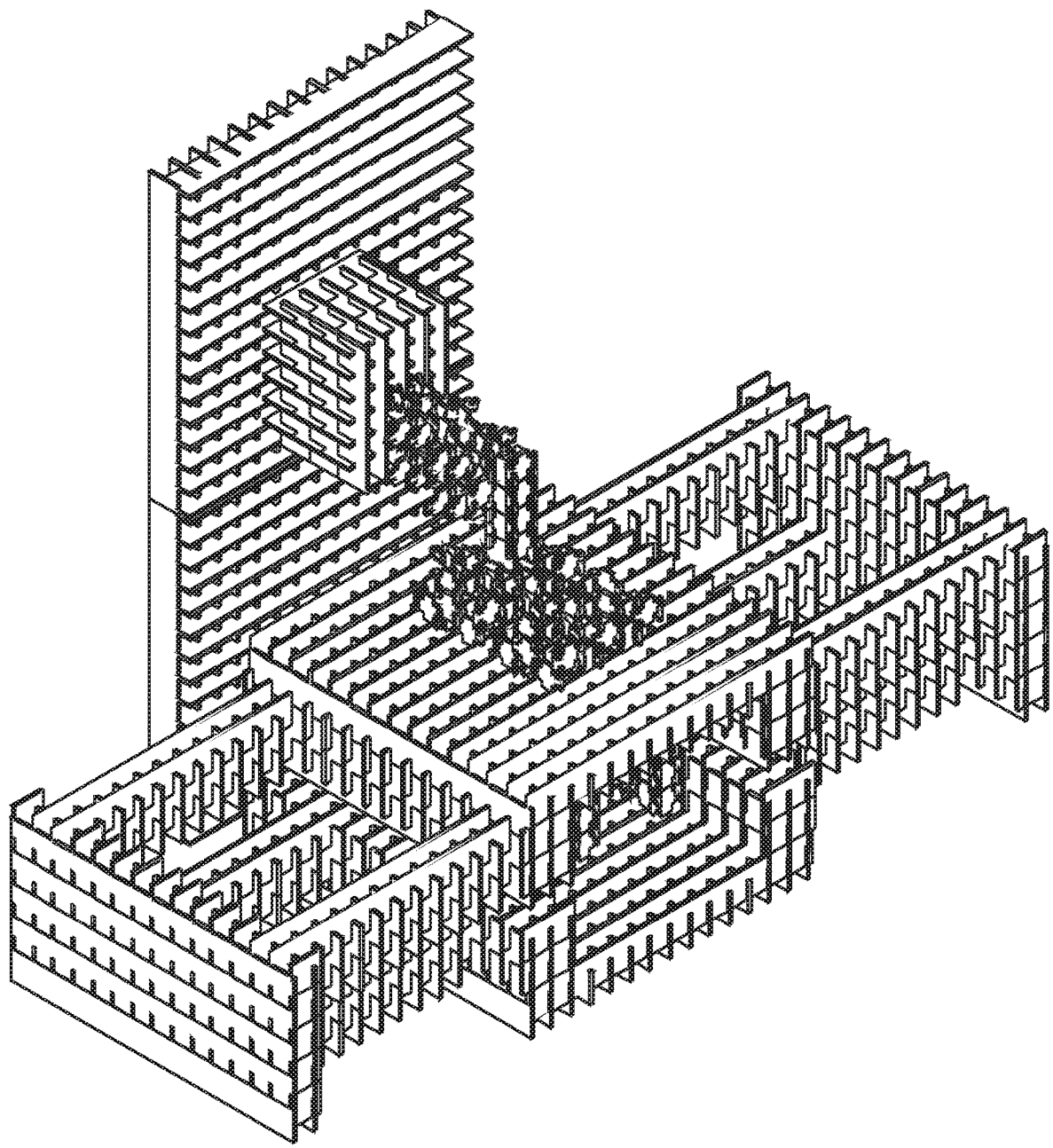
FIG. 16 shows robot composition.

FIG. 16 shows that these mechanisms can then be composed to form robots which are themselves capable of assembling the parts they are made out of.

Figure 17A:
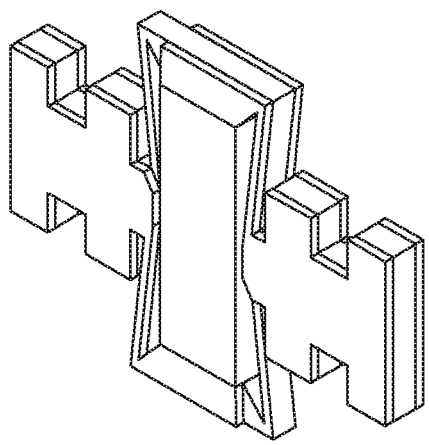
FIG. 17A shows an assembled piezo linear actuator.
Figure 17B:
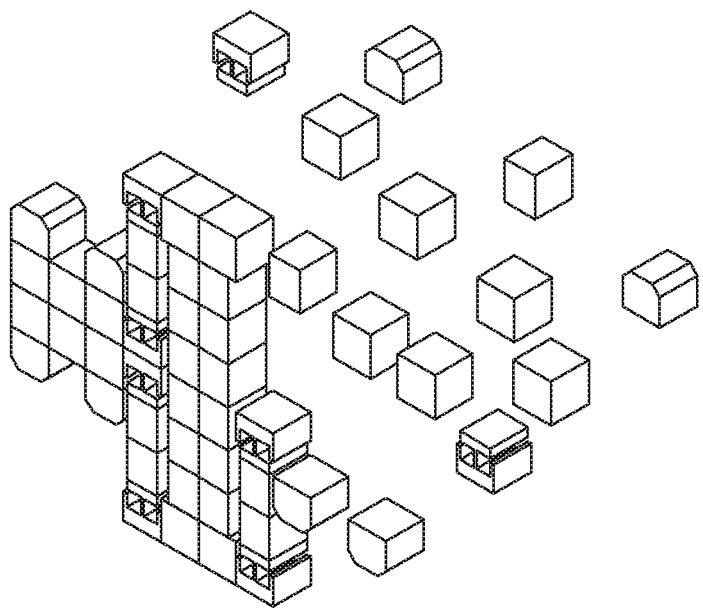
FIG. 17B shows how functions can be decomposed into constituent parts.
Figure 17C:
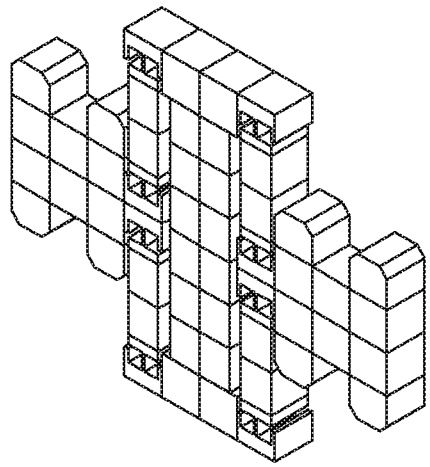
FIG. 17C shows the piezo linear actuator made up of its constituent parts.

FIGS. 17A-C shows the assembly of functional bricks. Through the development of robots with fine placement capabilities, the functional bricks themselves may be assembled from even more primitive single material building blocks. FIG. 17A-C show the same piezo linear actuator described by items 1202 and 1212 of FIG. 12. Expansion of the piezo bricks vertically creates an amplified deformation of the part, horizontally. This is showing how functions can be decomposed into constituent parts (in this case conductive, flexural, piezo, and insulating). FIG. 17A shows an assembled piezo linear actuator. FIG. 17B shows how functions can be decomposed into constituent parts. FIG. 17C shows the piezo linear actuator made up of its constituent parts.

Figure 18:
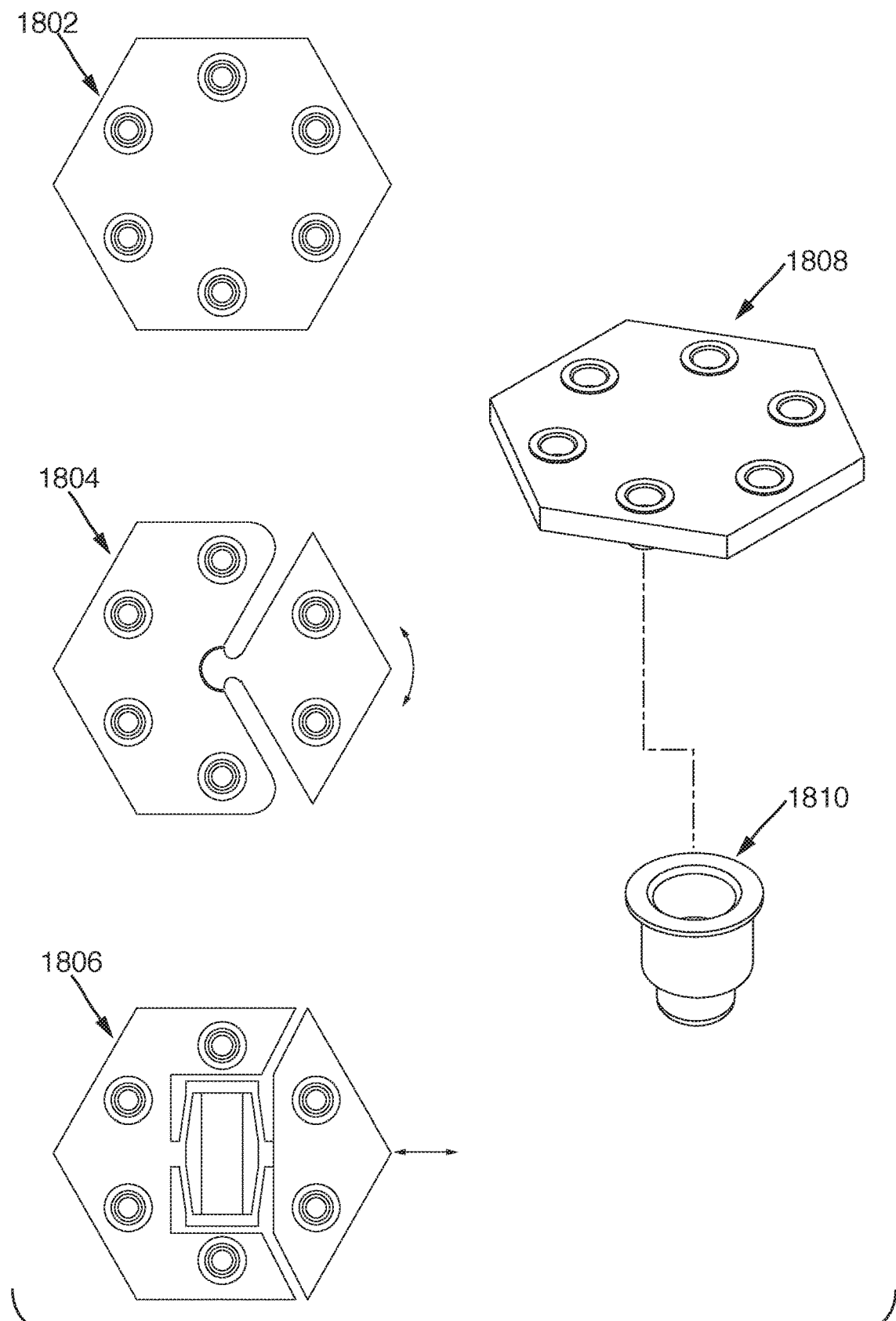
FIG. 18 shows an alternate geometry for functional parts.

FIG. 18 shows an alternate geometry for functional parts. Item 1802 is a basic insulating/structural part. Item 1804 is a revolute joint. Item 1806 is a piezo linear actuator (which functions the same as FIG. 17A-C). Item 1808 is an isometric view of the same part showing that the connections between parts are made with conductive press-fit sockets with both a male and a female end (item 1810).

Figure 19:
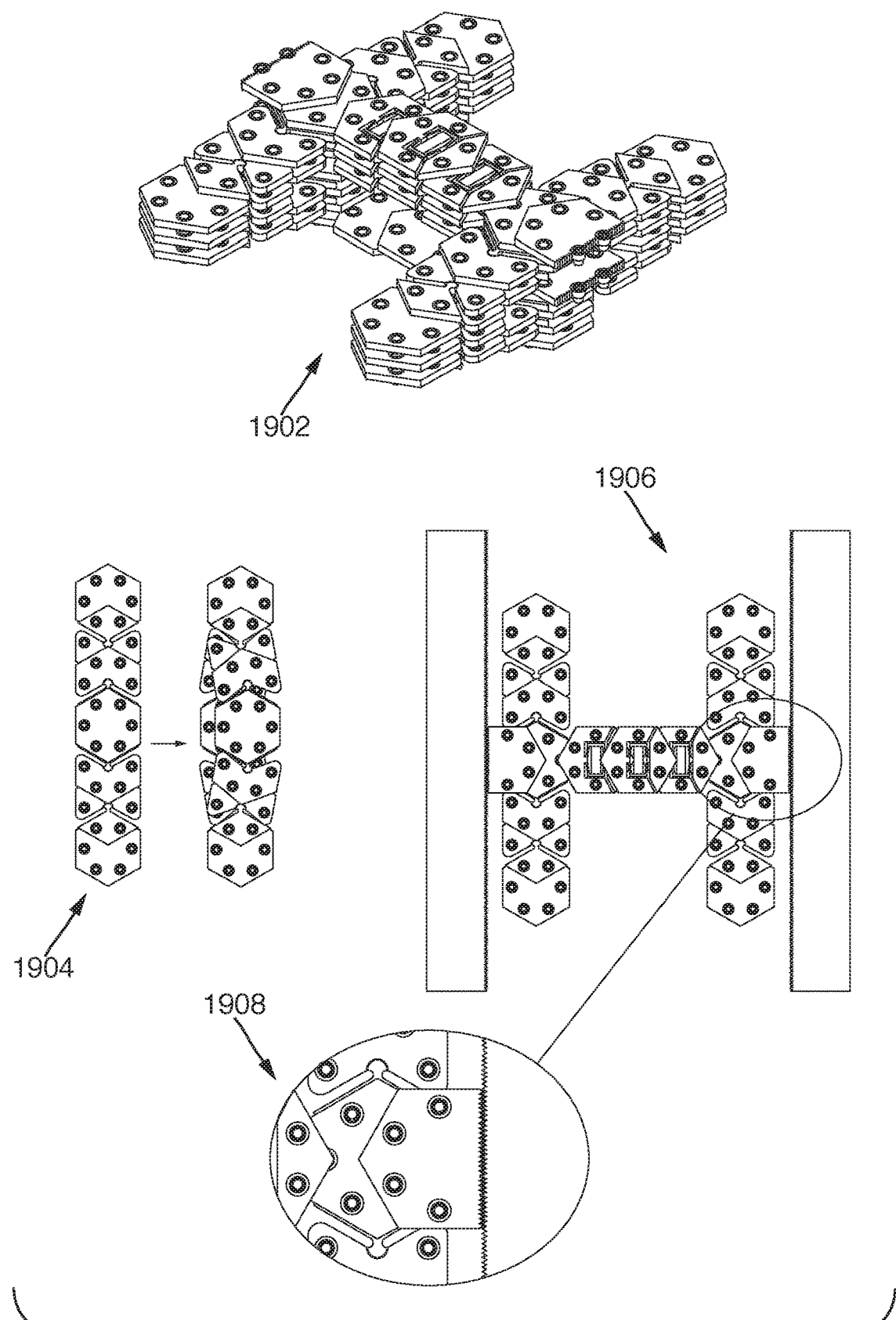
FIG. 19 shows a system assembled from hexagonal functional tiles.

FIG. 19 shows a system assembled from the hexagonal functional tiles. With these primitives, a large stroke linear actuator with motion constrained by a linear flexure stage can be assembled (item 1906). Item 1902 depicts the large stroke linear actuator with motion unconstrained by a linear flexure stage. In this case, piezo actuator blocks (which are centrally located in the system) cause the linear motion degree-of-freedom to deform and engage with a toothed profile (item 1904). This could be used as the clutch in an inchworm drive mechanism, for example. Item 1908 is a blown up pivot section of the large stroke linear actuator with motion constrained by a linear flexure stage shown by item 1906.

Figure 20:
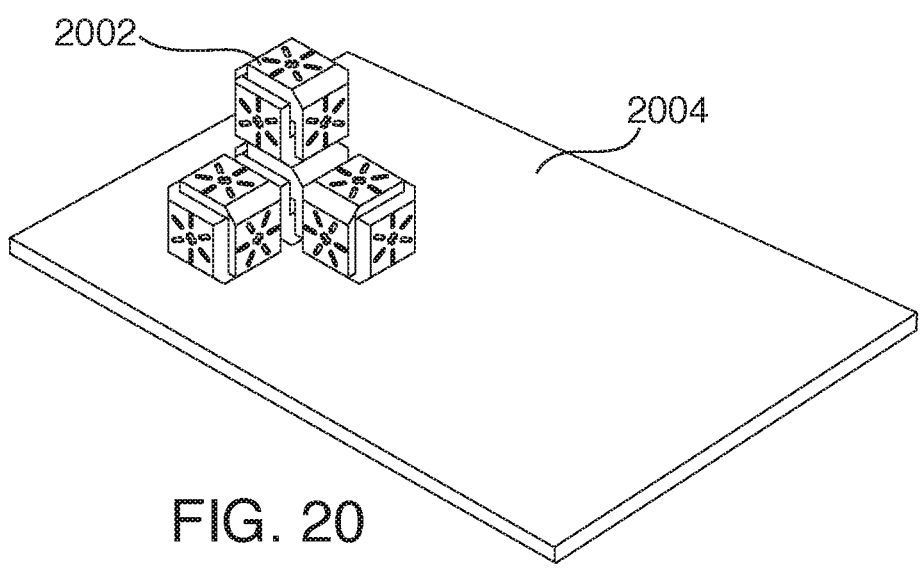
FIG. 20 shows an envisioned system capable of assembling another assembler like itself.
Figure 21:
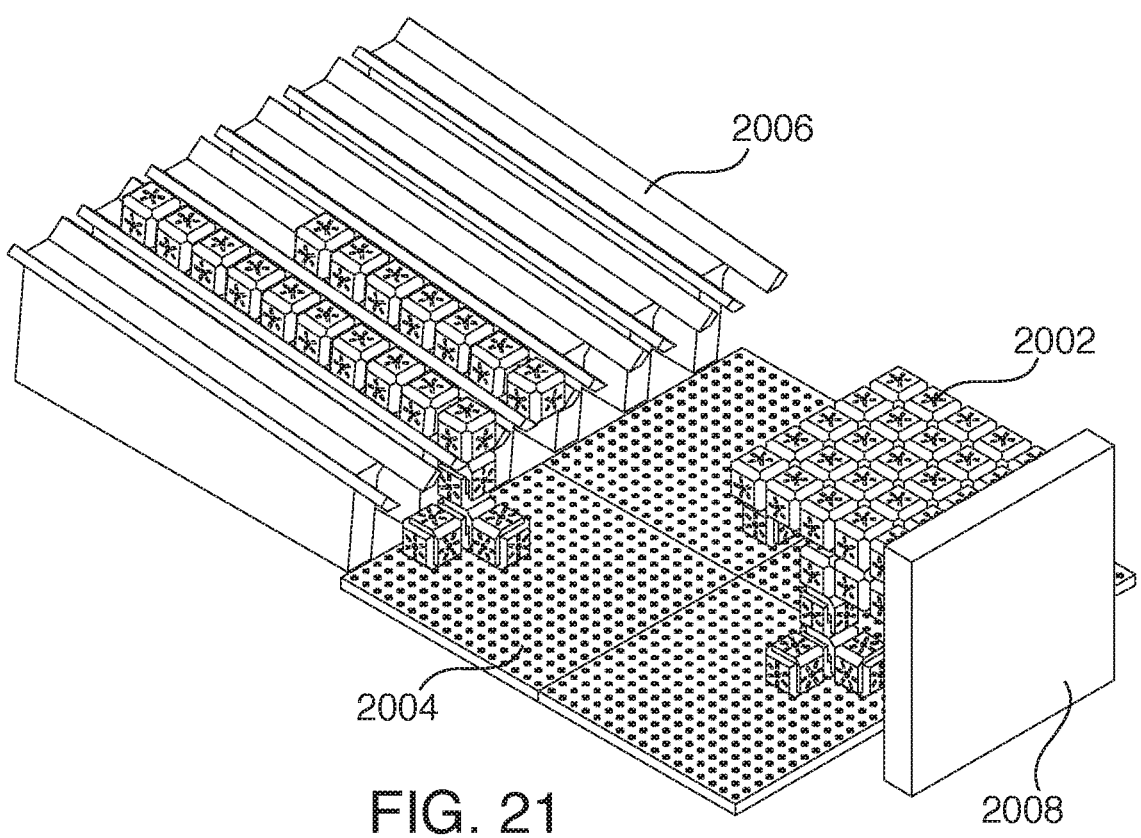
FIG. 21 depicts parts feeders at the edge of the grid and a build-stage with an additional degree-of-freedom to enable the assembly of arbitrary 3D structures.
Figure 22:
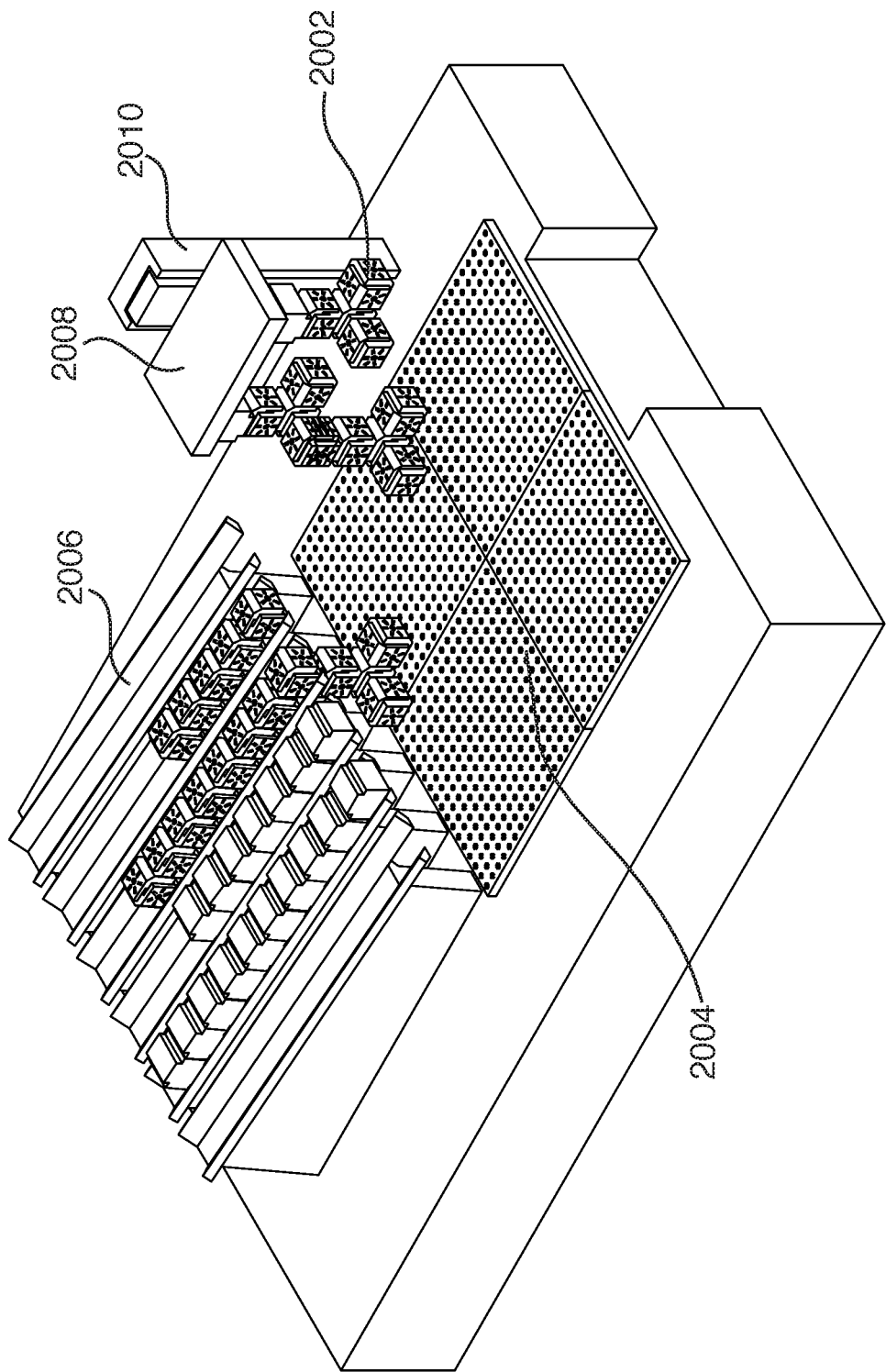
FIG. 22 shows an alternate arrangement allowing for the assembly of more assemblers where another external z-axis is used.

FIG. 20 shows an envisioned system capable of assembling another assembler like itself. It is composed of four identical linear actuator blocks 2002, enabling it to move on a grid 2004 in X and Y and also pick and place blocks with its Z axis. Each block 2002 has a microcontroller coordinating the motions. Power and control is sent through the grid 2004 that the assemblers latch into and operate on. FIG. 21 depicts this environment including parts feeders 2006 at the edge of the grid 2004 and a build-stage 2008 with an additional degree-of-freedom to enable the assembly of arbitrary 3D structures. FIG. 22 shows an alternate arrangement (blocks 2002, grid 2004, parts feeders 2006, build stage 2008) allowing for the assembly of more assemblers where another external z-axis 2010 is used.

Figure 23C:
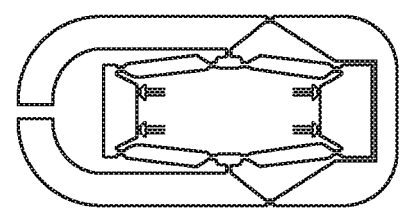
FIG. 23C depicts a microgripper prototype at a larger scale.
Figure 23B:
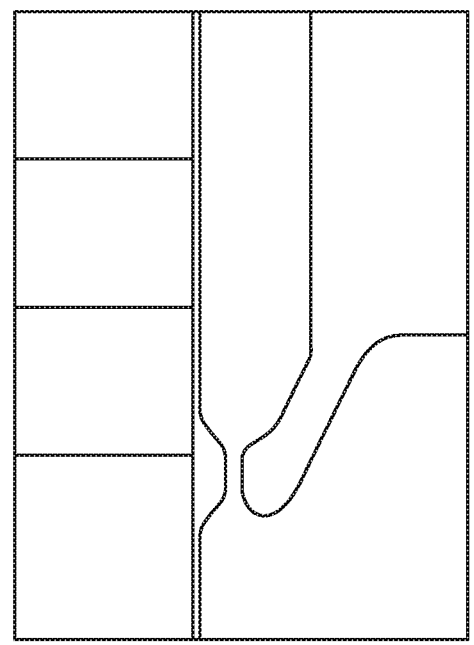
FIG. 23B shows an enlarged section of a prototype of a larger scale version of a piezo linear actuator.
Figure 23A:
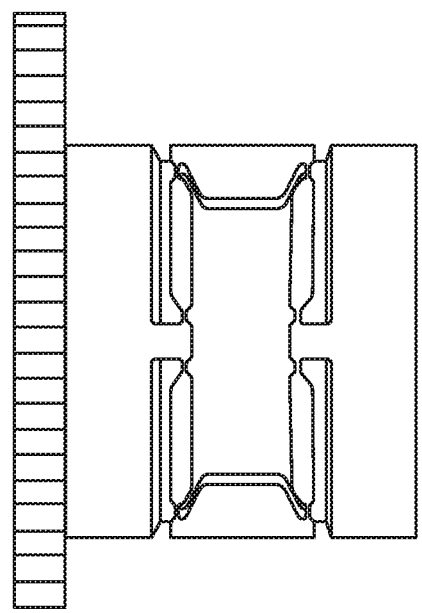
FIG. 23A is a prototype of a larger scale version of the piezo linear actuator described in FIG. 17A.
Figure 24A:
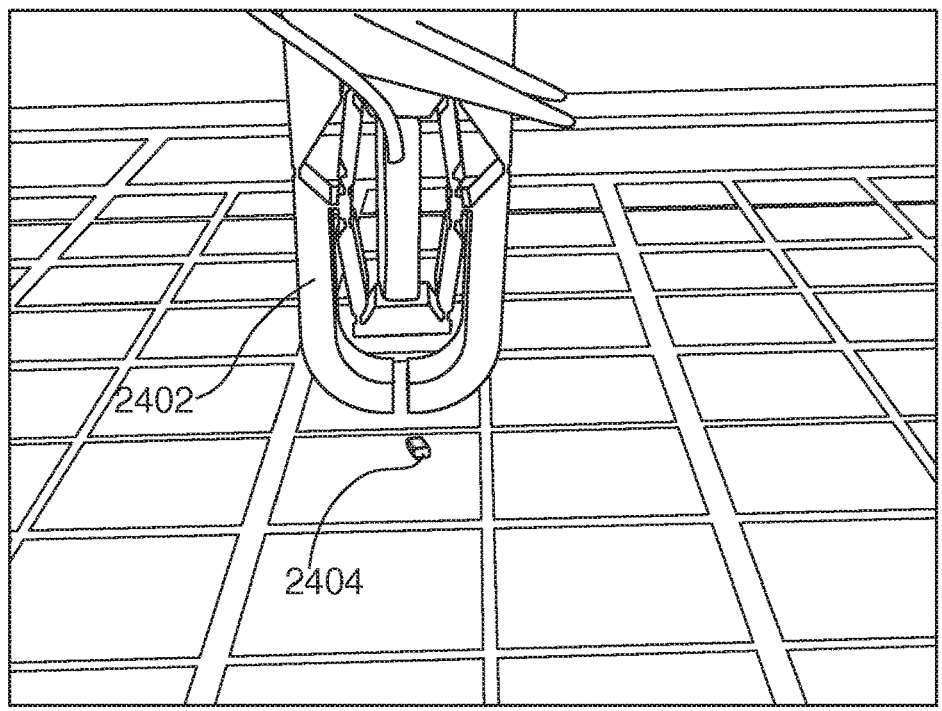
FIG. 24A shows a microgripper pickup test, as the microgripper is about to pickup an object.
Figure 24B:
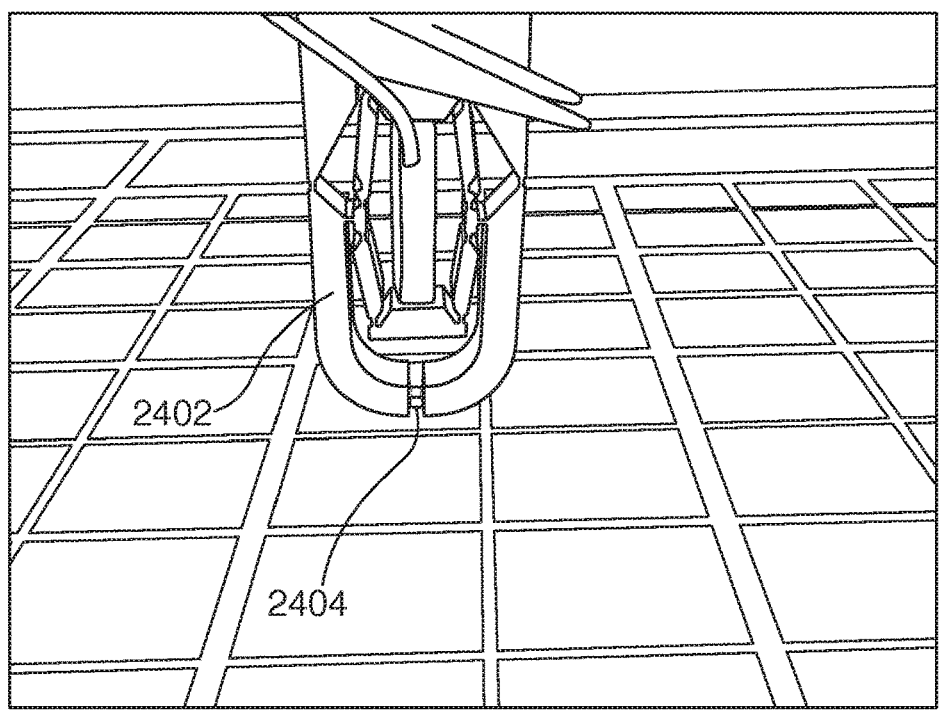
FIG. 24B shows a microgripper pickup test, after the microgripper has picked up an object.
Figure 25:
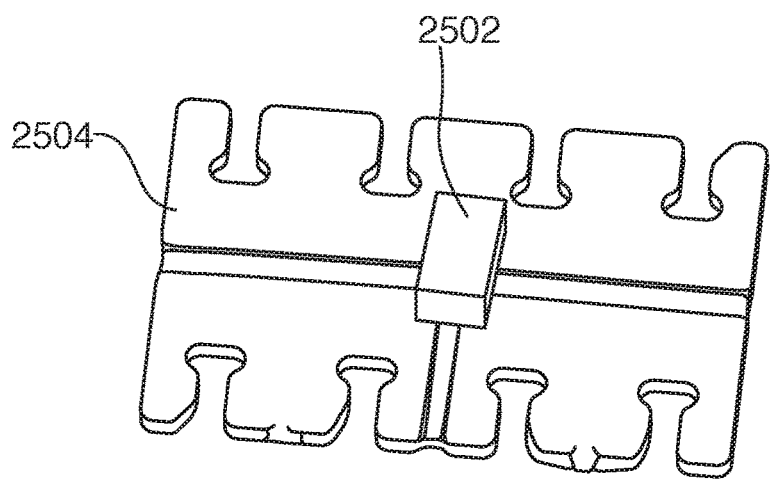
FIG. 25 shows a transistor mounted onto a building block.

FIGS. 23A-C show module prototyping. FIG. 23A is a larger scale version of the piezo linear actuators described in FIG. 17A, for example. It uses a conventional piezo stack actuator and houses it in a stainless steel flexure mechanism made using wire-edm. The flexure mechanism amplifies the stroke of the piezo stack by 20×. FIG. 23B shows an enlarged section of a prototype of a larger scale version of a piezo linear actuator. FIG. 23C depicts a microgripper prototype, again at a larger scale. The same amplifying mechanism is used to increase the stroke of the piezo actuator but in this case produce a displacement of gripper tips. FIG. 24A shows the microgripper pickup test, as the microgripper 2402 is about to pickup an object 2404. FIG. 24B shows the microgripper pickup test, after the microgripper 2402 has picked up an object 2404. FIG. 25 shows a transistor 2502 mounted onto a building block 2504 reflecting another geometry.

Figure 26A:
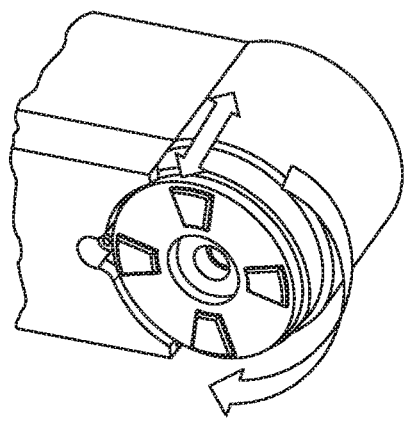
FIG. 26A illustrates a microstepper motor.
Figure 26B:
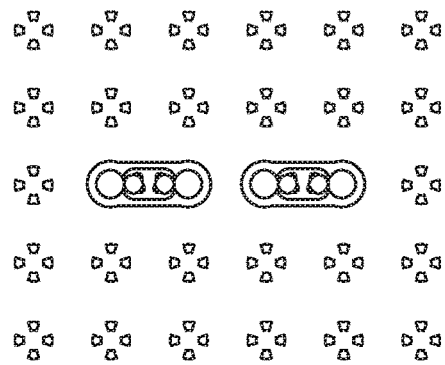
FIG. 26B shows the lattice on which the assemblers locomote.
Figure 26C:
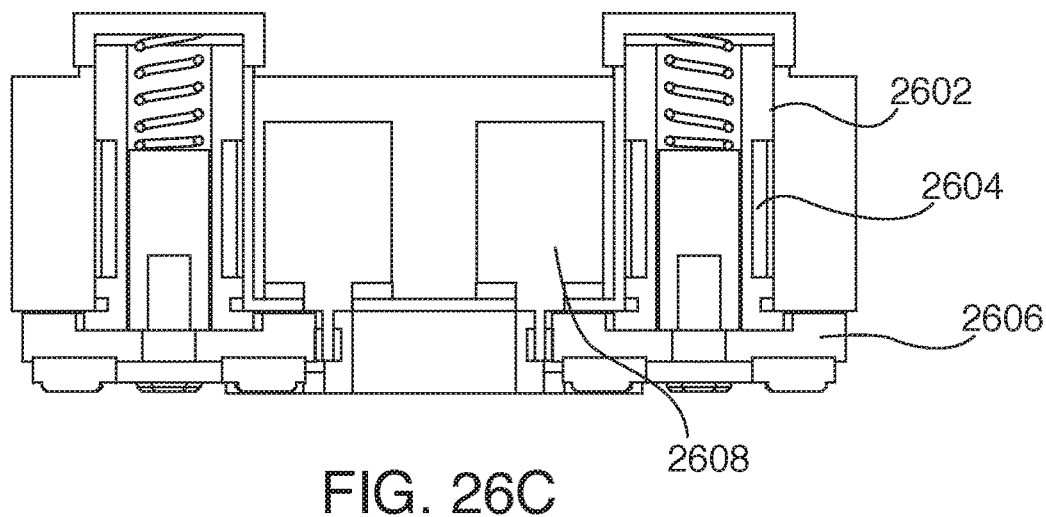
FIG. 26C is a blown up diagram of a mobile assembler.

FIG. 26A-C shows a mobile assembler model. FIG. 26A illustrates a microstepper motor. FIG. 26B shows the lattice on which the assemblers locomote. FIG. 26C is a blown up diagram of a mobile assembler, showing the bearing surface 2602, solenoid 2604, gear/foot 2606 and microstepper motor 2608. The rotary crawler has two controlled degrees of freedom and two one-bit actuators 2604. The assembler locomotes by clamping one foot 2606 to the substrate, releasing the other, and swinging about the clamped foot 2606. The one-bit actuators are solenoids 2604 that allow each foot 2606 to clamp or release from the substrate. Microstepper motors 2608 are used to provide controlled rotation of the body.

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A self-assembling system comprising:
  a linear step actuator module that moves from one lattice location to another lattice location on a grid;
  a plurality of mechanical, electrical, semiconducting, or magnetic, construction parts;
  a plurality of structural blocks having four in-plane connections;
  a plurality of actuator blocks having four in-plane connections, the construction parts, structural blocks and the actuator blocks being supplied from a feedstock located near the grid;
  at least one gripper module cooperating with the linear step actuator module to grip the construction parts, actuator blocks and structural blocks to move them to particular locations on the grid;
  wherein the linear step actuator module and the gripper module construct systems made of the construction parts, structural blocks and actuator blocks that interlock with one-another via at least two in-plane connections to produce functional bricks;
  wherein the grid supplies power and control signals to the linear step actuator module and the at least one gripper module.

2. The apparatus of claim 1, wherein the feedstock contains actuator and structural modules that are motion constraint modules, motion generation modules, or electronic modules, and wherein the motion constraint modules are revolute; the motion generation modules are walking, inching, or gripping, and the electronic modules are digital or analog, and wherein the digital modules are logic, flip flop, latch, or oscillator, and the analog modules are boost or op-amp.

3. The apparatus of claim 2, wherein each actuator or structural module has a function, and the functions are mechanical-passive, mechanical-active, electrical-passive, or electrical-active, and wherein the mechanical-passive functions are revolute, prismatic, or spring, the mechanical-active functions are bending, shearing, longitudinal, or transverse, the electrical-passive functions are conducting, insulating, resistive, capacitive or inductive, and the electrical-active functions are transistor or diode.

4. The apparatus of claim 1, wherein the mechanical construction parts are structural, flexible, or expanding, wherein the expanding parts are thermal or piezoelectric, the electrical construction parts are conductive, insulating, or resistive, the semiconducting constructions parts are N-type, P-type, N+ type, or P+ type, and the magnetic construction parts are soft, hard, or ferromagnetic.

5. The apparatus of claim 1, further comprising an assembler stage, said assembler stage comprising a walking leg mechanism, said walking leg mechanism comprising a large-displacement linear actuator mechanism, and said large displacement actuator mechanism comprising a piezoelectric or electromagnetic block, wherein the assembler stage is constructed to move from a first grid location to a second grid location during assembly of a functional brick to provide a stage upon which the functional brick is constructed, and to interconnect other functional bricks as they are assembled.

6. The apparatus of claim 1, wherein the system forms robots which are themselves capable of assembling the parts they are made from.

7. The apparatus of claim 1, wherein at least some of the construction parts comprise hexagonal tiles embedded with functions including rotary flexure, and linear actuation.

8. The apparatus of claim 1 wherein the structural and actuator blocks and functional bricks comprise a first size scale and a second size scale, wherein the first size scale is larger than the second size scale.

9. An apparatus that assembles itself from a feedstock of parts as building blocks, the apparatus operating on a lattice or grid on which it moves and from which it receives power and control signals comprising:
one or more step actuation modules that move from one lattice or grid location to the next;
one or more anchor modules that attach the apparatus to the lattice or grid;
one or more gripper modules that grip modules or parts from the feedstock of parts located in a build queue on or near the lattice or grid;
wherein, the one or more step actuation modules, anchor modules and gripper modules are themselves constructed from the modules and parts from the feedstock of parts;
the one or more step actuation modules, anchor modules and gripper modules cooperating to create functional bricks that can then create other modules or other functional bricks;
wherein the lattice or grid supplies the power and control signals to the one or more step actuation modules, the anchor modules and the gripper modules.

* * * * *

UNITED STATES PATENT AND TRADEMARK OFFICE
CERTIFICATE OF CORRECTION

PATENT NO. : 10,625,424 B2  
APPLICATION NO. : 15/338960  
DATED : April 21, 2020  
INVENTOR(S) : Langford, Ghassaei and Gershenfeld Page 1 of 1

It is certified that error appears in the above-identified patent and that said Letters Patent is hereby corrected as shown below:

In the Specification

Column 1, Line 11, replace the text "NSF-CMMI-1344222 awarded by NSF" with --W911NF-14-2-0063 awarded by the Army Research Office--.

Signed and Sealed this
Twenty-seventh Day of August, 2024

Katherine Kelly Vidal
*Director of the United States Patent and Trademark Office*